(12) United States Patent
Han et al.

(10) Patent No.: US 10,257,843 B2
(45) Date of Patent: Apr. 9, 2019

(54) METHOD FOR PROVIDING SERVICES AND ELECTRONIC DEVICE THEREOF

(71) Applicant: Samsung Electronics Co., Ltd., Suwon-si, Gyeonggi-do (KR)

(72) Inventors: Ji Yeon Han, Suwon-si (KR); Heejun Song, Seoul (KR); Junho Koh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/335,018

(22) Filed: Oct. 26, 2016

(65) Prior Publication Data
US 2017/0202002 A1 Jul. 13, 2017

(30) Foreign Application Priority Data

Jan. 7, 2016 (KR) .................. 10-2016-0001970

(51) Int. Cl.
*H04M 3/42* (2006.01)
*H04W 72/08* (2009.01)
*H04W 4/70* (2018.01)
*H04Q 9/00* (2006.01)

(52) U.S. Cl.
CPC ............ *H04W 72/085* (2013.01); *H04Q 9/00* (2013.01); *H04W 4/70* (2018.02)

(58) Field of Classification Search
None
See application file for complete search history.

(56) References Cited

U.S. PATENT DOCUMENTS

| | | | |
|---|---|---|---|
| 2013/0095858 A1 | 4/2013 | Lee et al. | |
| 2013/0218721 A1 | 8/2013 | Borhan et al. | |
| 2014/0022370 A1 | 1/2014 | Sohn et al. | |
| 2014/0188626 A1 | 7/2014 | Biswas | |
| 2015/0088641 A1* | 3/2015 | Aoki | G06Q 30/0251 705/14.49 |
| 2015/0186713 A1* | 7/2015 | Cao | G06K 9/00342 382/103 |

(Continued)

FOREIGN PATENT DOCUMENTS

| | | |
|---|---|---|
| JP | 2015088166 A | 5/2015 |
| KR | 10-2004-0083964 A | 10/2004 |

(Continued)

OTHER PUBLICATIONS

Manjuatha M B, et al., "Survey on Skeleton Gesture Recognition Provided by Kinect", International Journal of Advanced Research in Electrical, Electronics and Instrumentation Engineering, vol. 3, Issue 4, Apr. 2014, pp. 8475-8483.

(Continued)

*Primary Examiner* — Moustapha Diaby
(74) *Attorney, Agent, or Firm* — Jefferson IP Law, LLP

(57) ABSTRACT

A digital media device is provided. The digital media device includes a processor, a transceiver configured to be operationally connected with the processor, and a sensor configured to be operationally connected with the processor. The processor may be configured to receive identification information of an object when an event occurs, obtain state information of a user within a specific distance from the object, and create reaction information with respect to the object based on the state information.

14 Claims, 32 Drawing Sheets

(56) References Cited

U.S. PATENT DOCUMENTS

2016/0171289 A1   6/2016 Lee et al.
2016/0379225 A1* 12/2016 Rider ................. G06Q 30/0201
                                                    382/116

FOREIGN PATENT DOCUMENTS

| KR | 20110019210 A  | 2/2011  |
|----|----------------|---------|
| KR | 101024501 B1   | 3/2011  |
| KR | 101431804 B1   | 8/2014  |
| KR | 20140121764 A  | 10/2014 |
| KR | 20150012918 A  | 2/2015  |

OTHER PUBLICATIONS

Nam Soo Kim, "And Perspective on Emotion Recognition Technologies", 2009, pp. 773-785.
J.Y. Chang et al., "Technology Trends of Range Image based Gesture Recognition" (2014) Electronics and Telecommunication Research Institute.
Jae Hun Bang et al, "Call Speech Emotion Recognition for Emotion based Services", 2014, pp. 208-213.
Joa-SangLim et al., "An Empirical Comparison of Machine Learning Models for Classifying Emotions in Korean Twitter", Journal of Korea Multimedia Society vol. 17, No. Feb. 2014, pp. 232-2396.
Jo, Eunkyoung. 2012, "The Current State of Affairs of the Sentiment Analysis and Case Study Based on Corpus", The Journal of Linguistic Science 61, 2012, pp. 259-282.

* cited by examiner

METHOD FOR PROVIDING SERVICES AND ELECTRONIC DEVICE THEREOF

CROSS REFERENCE TO RELATED APPLICATION(S)

This application claims the benefit under 35 U.S.C. § 119(a) of a Korean patent application filed on Jan. 7, 2016 in the Korean Intellectual Property Office and assigned Serial number 10-2016-0001970, the entire disclosure of which is hereby incorporated by reference.

TECHNICAL FIELD

The present disclosure relates to an electronic device for providing services by using communication, and to an operating method thereof.

BACKGROUND

Recently, with the development of digital technology, various types of electronic devices have been widely used, such as mobile communication terminals, smart phones, tablet personal computers (PCs), personal digital assistants (PDAs), electronic organizers, notebook computers, large format displays (LFDs), digital signage, digital information displays (DIDs), mirror displays, or wearable devices that include smart watches, smart bands, or smart clothes. The electronic devices have reached a level of mobile convergence in which the electronic devices encompass functions of other devices. For example, the electronic devices may provide: a call function, such as a voice call and a video call; a message transmission and reception function, such as short message service (SMS)/multimedia message service (MMS) and e-mail; an electronic organizer function; a photographing function; a broadcast reproducing function; a video reproducing function; a music reproducing function; the internet function; a messenger function; a game function; or a social networking service (SNS) function.

With the development of communication technology, a service is required, which can reflect, in real time, the user's feedback on the object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and an operating method thereof for providing feedback on the object based on a user's state information.

In accordance with an aspect of the present disclosure, an operating method of a digital media device is provided. The operating method includes, when an event occurs, receiving identification information of an object from the other electronic device, obtaining state information of a user who is within a specific distance from the object, and creating reaction information with respect to the object based on the state information.

In accordance with another aspect of the present disclosure, a digital media device is provided. The digital media device includes a processor, a transceiver configured to be operationally connected with the processor, and a sensor configured to be operationally connected with the processor, wherein the processor may be configured to receive identification information of an object when an event occurs, obtain state information of a user who is within a specific distance from the object, and create reaction information with respect to the object based on the state information.

The electronic device and the operating method thereof, according to various embodiments, may effectively provide the user with services on the object by using communication.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
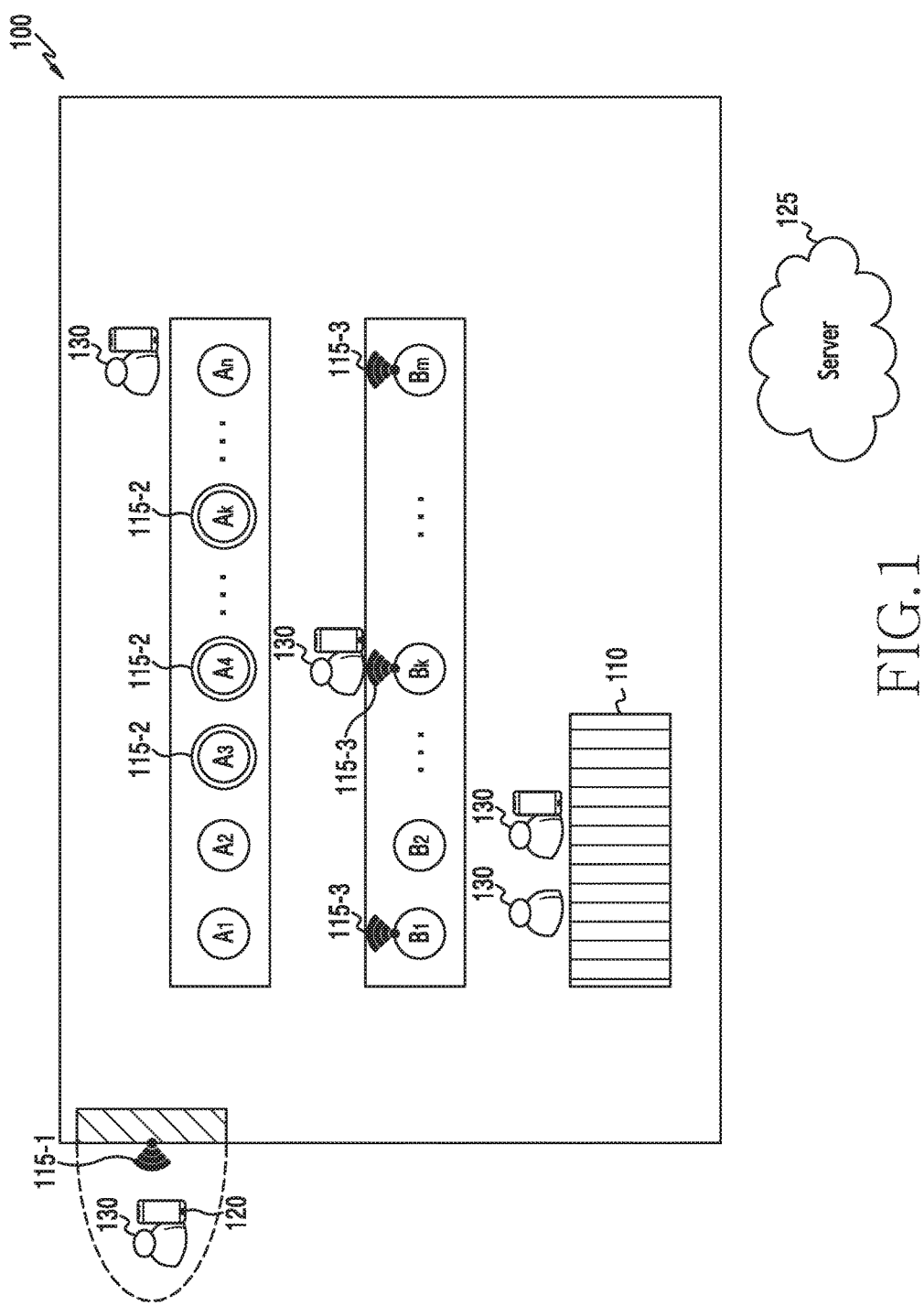
FIG. 1 illustrates a network environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the present specification, the description "one element, such as a film, an area, or a wafer (a substrate), is "connected," or "coupled," "to" another element" may be interpreted that the one element is directly "connected," or "coupled," "to" another element to then come into contact with the same, or may be interpreted that another element may be interposed therebetween. On the contrary, the description "one element is "directly connected," or "directly coupled," "to" another element" may be interpreted that no element is interposed therebetween. The same reference numeral denotes the same element. As used in this document, the term "and/or" includes any one of the listed corresponding items and all combinations thereof.

Although the terms "the first" and "the second" are used to explain various members, components, areas, layers, and/or parts, it is obvious that the members, components, areas, layers, and/or parts should not be limited to the terms. The terms will be used only to distinguish one element, component, area, layer, or part from the other element, component, area, layer, or part. Therefore, the first member, component, region, area, or part, which will be described below, may refer to the second member, component, area, layer, or part without departing from the teachings of the present disclosure.

In addition, the relative terms, such as "on" or "above," and "below" or "lower," may be used herein to describe the relationship between specific elements and other elements as illustrated in the drawings. It may be understood that the relative terms are intended to include other directions of the elements in addition to the directions that are illustrated in the drawings. For example, if elements are turned over in the drawings, the elements that are illustrated to be placed on the upper surfaces of other elements will be positioned on the lower surfaces of the aforementioned elements. Therefore, the term "on" may include all directions encompassing "lower" and "on" depending on a specific direction of the drawing. If the element is directed toward the other direction (rotating at 90° with respect to the other direction), the relative description in the present specification may be interpreted according thereto.

In addition, when the terms "comprise" and/or "comprising" are used in the present disclosure, the terms are intended to specify the existence of the above-mentioned shapes, numbers, operations, members, elements, and/or a group thereof, but are not intended to exclude the existence or addition of one or more other shapes, numbers, operations, members, elements, and/or groups thereof.

Hereinafter, the embodiments of the present disclosure will be described with reference to the drawings that schematically show ideal embodiments of the present disclosure. In the drawings, deformations of the shapes shown in the drawings may be expected, for example, depending on the manufacturing techniques and/or tolerance. Therefore, the embodiments of the present disclosure should not be construed to be limited to specific shapes of areas illustrated herein, and, for example, should include a change in the shapes resulting from the manufacturing. The present disclosure may be configured by one embodiment or by a combination of a plurality of embodiments.

The electronic device described below, according to various embodiments, may have various configurations, and the following description will provide configurations necessary for examples, but the present disclosure is not limited thereto.

A variety of objects may be provided to the user according to the development of industrial technologies. The various objects may be researched or developed in terms of manufacturers. In addition, with the development of communication technology, big data may be provided to the user and the manufacturer by using wired or wireless communication. The electronic device, according to various embodiments, may provide feedback on the object to the user by using the big data through wired or wireless communication. The electronic device may provide the manufacturer with feedback through the big data so that the manufacturer may reflect the user's needs based on state information of the user.

FIG. 1 illustrates a network environment according to various embodiments of the present disclosure.

Referring to FIG. 1, the network environment 100 may include an electronic device 110, one or more other electronic devices 115-1 to 115-3 (hereafter, referred to as the other electronic device 115 for the convenience of explanation), a user equipment (UE) 120, and a server 125.

The network environment 100 may provide objects to the user. The objects may have a non-commercial purpose as well as a commercial purpose. The objects may include tangibles. The objects may include intangibles, such as elemental forces, as well as the tangibles. The tangibles may have fixed pups. For example, the tangibles may be cars, smart phones, clothing, or pets, such as dogs. The intangibles may be objects that have no fixed shape. For example, the intangibles may be electricity, heat, light, or a fragrance. The objects may include products.

The network environment 100 may provide one or more users 130 (hereinafter, referred to as the user 130 for the convenience of explanation) with information on the object by using the elements (e.g., the electronic device 110, the other electronic device 115, the UE 120, the server 125, or the like) that are included in the network environment 100. The network environment 100 may collect state information of the user by using the elements that are included in the network environment 100 for the purpose of determining the intention of the user 130 with respect to the object. The network environment 100 may provide the user 130 with feedback on the object. The network environment 100 may provide feedback on the object to the manufacturer (not shown) or the developer (not shown). The feedback may be created based on the collected state information of the user.

The electronic device 110 may be communicatively connected with at least one of: the other electronic device 115; the UE 120; or the server 125. The electronic device 110 may be referred to as a digital media device. The electronic device 110 may be directly connected with at least one of: the other electronic device 115; the UE 120; or the server 125.

The electronic device 110 may collect state information of the user 130. The electronic device 110 may provide feedback on the object to the user 130 through a display that is included in the electronic device 110. The electronic device 110 may communicate with at least one of: the other electronic device 115; the UE 120; or the server 125. For example, the electronic device 110 may be a large format display (LFD) that adopts a communication function. The LFD may be a digital signage or a digital information display (DID). As another example, the electronic device 110 may be a mirror display that adopts a communication function.

The other electronic device 115 may be a device that is related to the object. The other electronic device 115 may be a device corresponding to the object. The other electronic device 115 may be operationally coupled to the objects. The other electronic device 115 may be paired with the object by one to one. In some embodiments, the other electronic devices 115 may be paired with the objects by n to one or by one to n. Here, n may be a natural number, or may be a prime number.

The other electronic device 115 may be fixed and installed in a specific area or location in the store. In some embodiments, the other electronic device 115 may be mobile.

The other electronic device 115 may provide information to the electronic device 110. For example, the information may relate to whether or not the user 130 uses (or wears) the object corresponding to the other electronic device 115, or to whether or not the state of the object corresponding to the other electronic device 115 is updated.

The other electronic device 115 may be a communication device. In some embodiments, the other electronic device 115 may be a sensor.

The other electronic device 115 may include a device that transmits a short-range wireless signal to the electronic device 110. The other electronic device 115 may be implemented in various forms. For example, the other electronic device 115 may be implemented to be embedded in the object that corresponds to the other electronic device 115. As another example, the other electronic device 115 may be implemented to be separately attached to the corresponding object.

The UE 120 may be a mobile phone, a smart phone, a personal digital assistant (PDA), a portable multimedia player (PMP), a digital camera, a music player, a portable game console, a navigation system, a laptop computer, a wearable device, or the like.

The UE 120 may be a device corresponding to the user 130. The UE 120 may be paired with the user 130 by one to one, by one to n, or by n to one. Here, n may be a natural number, or may be a prime number. For example, the UE 120 may be paired with a person who carries the UE 120 and his/her companions.

The UE 120 may be communicatively connected with the other electronic device 115. For example, when the user 130 enters the network environment 100 or the store while carrying the UE 120, the UE 120 may be operationally or communicatively connected to the other electronic device 115.

The UE 120 may provide the electronic device 110 with the state information of the corresponding user. The UE 120 may receive, from the electronic device 110, information on the object related to the user.

The server 125 may be communicatively connected to at least one of: the electronic device 110; the other electronic device 115; or the UE 120. In some embodiments, the server 125 may be combined with the electronic device 110 to be implemented as a single electronic device.

The server 125 may be located within the network environment 100, or may be located on the outside. For example, the server 125 may be a server in the store. As another example, the server 125 may be a server (e.g., a cloud server) that is located outside the store.

The server 125 may store big data. The big data may be created in a digital environment. The big data may include a variety of data. For example, the big data may contain data, such as user's gestures, location information, or thoughts of the object.

The server 125 may provide information to at least one of: the electronic device 110; the other electronic device 115; the UE 120; or the user 130 by using the big data that is stored in the server 125. The server 125 may receive information on the big data from at least one of: the electronic device 110; the other electronic device 115; the UE 120; or the user 130, and update the stored big data.

Figure 2:
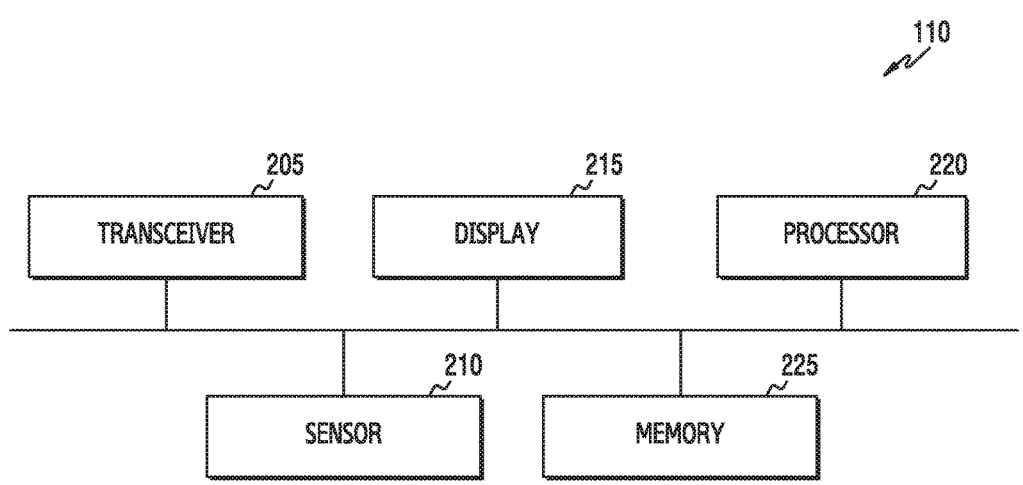
FIG. 2 illustrates a functional block diagram of an electronic device according to various embodiments of the present disclosure.

FIG. 2 illustrates a functional block diagram of an electronic device according to various embodiments of the present disclosure. The block configuration may be included in the electronic device 110 shown in FIG. 1.

Referring to FIG. 2, the electronic device 110 may include a transceiver 205, a sensor 210, a display 215, a processor 220, and/or a memory 225.

The transceiver 205 may configure telecommunication between the electronic device 110 and external devices. For example, in order to execute or control an application, the transceiver 205 may be connected to a network through a wide area network (WAN) communication scheme in order to thereby communicate with the external devices. For example, the transceiver 205 may communicate with other devices (e.g., the other electronic device 115, the UE 120, and the server 125, which are shown in FIG. 1) by using the long term evolution (LTE) standard or the worldwide interoperability for microwave access (WiMAX) standard. As another example, the transceiver 205 may communicate with other devices by using multiple access schemes, such as code division multiple access (CDMA), wideband CDMA (WCDMA), orthogonal frequency multiple access (OFDM), filter bank multi carrier (FBMC), non orthogonal multiple access (NOMA), or sparse code multiple access (SCMA).

The transceiver 205 may configure short-range communication between the electronic device 110 and external devices. For example, in order to execute or control an application, the transceiver 205 may communicate with the external devices through short-range communication schemes. For example, the transceiver 205 may communicate with other devices through communication schemes, such as Bluetooth, Bluetooth low energy (BLE), Wi-Fi direct, device to device (D2D) of LTE, or human body communication.

The transceiver 205 may include a plurality of antennas. The transceiver 205 may include a transmitter and/or a receiver. The transceiver 205 may include a source encoder, a channel encoder, and/or a modulator. The transceiver 205 may include a source encoder, a channel encoder, and/or a demodulator.

The sensor 210 may sense the external environment of the electronic device 110.

In some embodiments, the sensor 210 may be an image sensor for sensing images. The sensor 210 may transmit created image information to the processor 220. In some embodiments, the sensor 210 may be a biometric sensor for detecting biometric information. For example, the sensor 210 may detect fingerprints, iris patterns, vein patterns, a heart rate, blood glucose, or the like, and may create sensed data corresponding to the detected information. The sensor 210 is not limited to the image sensor or the biometric sensor described above, and may include various types of sensors. For example, the sensor 210 may be any sensor, such as an illuminance sensor, an acoustic sensor, an acceleration sensor, a proximity sensor, or the like.

The display 215 may output data or signals. For example, the display 215 may output image data that is sensed by using the sensor 210. As another example, the display 215 may display image signals that are processed by the processor 220. The display 215 may display captured or still images, or may display videos or camera preview images. The display 215 may be a liquid crystal display (LCD) or an organic light emitting diode (OLED).

The display 215 may be configured to be integrated as a touch screen by being combined with an input/output device (not shown).

The display 215 may display the user and the object that is carried by, or worn on, the user. In this case, the display 215 may perform an electronic mirror function.

The processor 220 may control the overall operations of the electronic device 110. The processor 220 may execute applications that provide Internet browsers, games, videos, or the like. In some embodiments, the processor 220 may include a single-core processor or a multiple-core processor. For example, the processor 220 may include a multi-core processor, such as a dual-core processor, a quad-core processor, a hexa-core processor, or the like. According to some embodiments, the processor 220 may further include a cache memory that is positioned in the inside or on the outside.

The processor 220 may receive commands from other elements of the electronic device 110; interpret the received commands; and perform a calculation or the processing of data according to the interpreted commands.

The processor 220 may process data or signals that are created or generated by the applications. For example, the processor 220 may make a request to the memory 225 for data or signals for the application. The processor 220 may record (or store), or update, data or signals in the memory 225 for the application.

The processor 220 may interpret and process messages, data, or signals received from the transceiver 205. The processor 220 may interpret and process messages, data, or signals received from the sensor 210. The processor 220 may create new messages, data, or signals based on the received messages, data, or signals. The processor 220 may provide the processed or created messages, data, or signals to the display 215.

The processor 220 may be operationally combined with other elements (e.g., the transceiver 205, the sensor 210, the display 215, or the memory 225) in the electronic device 110.

The processor 220 may recognize the UE that enters the store or the network (for example, the network environment 100 shown in FIG. 1). In the case where the other electronic device 115 is installed at the store entrance, the UE 120 may receive, from the other electronic device 115, identification information of the other electronic device 115. In response to the reception of the identification information of the other electronic device 115, the UE 120 may transmit the identification information of the UE 120 to the server 125. The processor 220 may receive the identification information of the UE 120 from the server 125. The processor 220 may recognize that the UE 120 approaches, or enters, the network environment 100 through the received identification information of the UE 120.

The processor 220 may recognize that the UE 120 approaches, or enters, the network environment 100 in order to thereby reduce the complexity in subsequent operations. For example, in the case where the user, or a change in the state of the UE 120, is detected, the processor 220 may detect the state change from a candidate group that is comprised only of the UEs that have approached, or entered, the network environment 100.

The processor 220 may recognize whether or not the object is positioned close to the electronic device 110.

In the case where the other electronic device 115 corresponding to the object includes a transceiver, the other electronic device 115 may transmit the identification information of the object in a designated cycle. In some embodiments, the identification information of the object may be a beacon signal that is transmitted from the electronic device 115 corresponding to the object. The beacon signal may contain a classification identifier (ID) and a unique ID. For example, the first beacon signal, which is one of a plurality of beacon signals, may contain a classification ID indicating the object classification "shoes," and a unique ID indicating more detailed information of the object classification (for example, indicating a specific store that sells the "shoes"). As another example, the second beacon signal, which is another of a plurality of beacon signals, may contain a classification ID indicating the object classification "clothing," and a unique ID indicating a specific store that sells the "clothing".

In the present disclosure, the classification ID may be referred to as an upper ID or a primary ID, and the unique ID may be referred to as a lower ID or a secondary ID.

The classification ID may indicate the object or the type of service that is provided by the store where a beacon device is positioned, which transmits a beacon signal that contains the classification ID. For example, the classification ID may indicate that the store, in which the beacon device is located, sells one of: food; clothing; home appliances; tools; sporting goods; cosmetics; or the like. As another example, the classification ID may specifically classify and indicate the objects that are sold in the store where the beacon device is positioned. In the case where clothing is sold in the store where the beacon device is located, the classification ID may indicate that the store, where the beacon device is located, sells one of: outdoor coats; long johns; suits; underwear; or sportswear.

In some embodiments, the beacon signals, which are transmitted from the beacon devices that are located in the stores that are classified to sell the same type of object, may contain the same classification ID. The type of object indicated by the classification ID may be variously configured. For example, in the case where the classification ID is configured to indicate the object types corresponding to food, clothing, home appliances, tools, sporting goods, or cosmetics, the beacon device, which is located in the store of the same object type (e.g., a suit store and a sportswear store, which belong to the same object type "clothing"), may transmit a beacon signal containing the same classification ID.

Unlike some embodiments above, in some embodiments, the classification ID may indicate the detailed type of object of the same object type. For example, in the case where each classification ID is configured to indicate the detailed type of object, the beacon devices, which are located in the suit store and the sportswear store, respectively, may transmit beacon signals that contain different classification IDs from each other, even though they belong to the same object type "clothing."

The distribution method (or determination method) of the classification IDs described above is only an example, and various distribution methods of the classification IDs may be applied to the present disclosure.

The unique ID may perform a function for identifying a variety of stores selling the object. For example, when different stores sell the same type of object in the department store, the beacon devices, which are located in the different stores, respectively, may transmit beacon signals that contain different unique IDs from each other. In addition, the unique ID may classify, in more detail, the type of object that is indicated by the classification ID. For example, if the classification ID included in the beacon signal indicates the type of object "clothing," the unique ID included in the beacon signal may indicate the store of a specific brand (e.g., ZIOZIA™, LUOMO™, Polo', BEANPOLE™, etc.), which sells "clothing" in the department store. As another example, if the classification ID included in the beacon signal indicates the type of object "shoes," the unique ID included in the beacon signal may indicate the store of a specific brand (e.g., Nike', Adidas™, FILA™, Reebok™, etc.), which sells "shoes" in the department store. If there are two or more brand stores that sell the same type of product in the same department store, the beacon signals, which are transmitted from the beacon devices that are located in the two or more stores, respectively, may contain the same classification ID, but may contain different unique IDs from each other. For example, if there are two "Nike™ stores" in the same department store, the beacon signals, which are transmitted from the beacon devices that are located in the Nike™ stores, respectively, may contain the same classification ID and different unique IDs.

The electronic device 110 may obtain, through the unique ID, information on the object that is sold in a specific store corresponding to the unique ID.

When the other electronic device 115 is positioned close to the electronic device 110, the processor 220 may receive identification information of the object from the other electronic device 115. The processor 220 may recognize that the object is positioned close to the electronic device 110 through the received identification information of the object. The processor 220 may receive the identification information of the object by various communication schemes that have been mentioned in relation to the transceiver 205, such as Bluetooth, BLE, Wi-Fi direct, D2D communication of LTE, or the like.

The processor 220 may recognize whether or not the object is close by using the sensor 210. The processor 220 may recognize the type of object through the sensor 210 (e.g., a camera or an image sensor). The processor 220 may more easily recognize the object through the identification information of the object. For example, if the other electronic device 115 corresponding to the object includes the sensor and the transceiver, the other electronic device 115 may detect a change in the state of the object. The other electronic device 115 may detect the motion of the object, and may detect a user's touch (e.g., a hand touch or a finger touch) with respect to the object. In response to the detected change in the state of the object, the other electronic device 115 may transmit the identification information of the object to the server 125. The processor 220 may receive the identification information of the object from the server 125. The processor 220 may recognize the change in the state of the object through the identification information of the object. In addition, through the identification information of the object, the processor 220 may classify the object, of which the state change has been detected, as a candidate group that can approach the electronic device 110. In addition, through the identification information of the object, the processor 220 may activate the sensor 210 for the object of which the state change has been detected. The processor 220 may recognize the type of object by using the activated sensor 210. In addition, the processor 220 may recognize the approach of the object. For example, the processor 220 may determine whether or not the object is contained in an image that is obtained through the sensor 210. If the object is contained in the obtained image, the processor 220 may recognize whether or not the object is positioned close to the electronic device 110.

The processor 220 may recognize whether or not the user is positioned close to the electronic device 110.

The processor 220 may transmit the identification information of the electronic device 110 in a designated period. If the UE 120 corresponding to the user (for example, the UE 120 that is carried by, or worn on, the user) is positioned close to the electronic device 110, the UE 120 may receive the identification information of the electronic device 110. The UE 120 may receive the identification information of the electronic device 110 by the various communication schemes that have been mentioned in relation to the transceiver 205, such as Bluetooth, BLE, Wi-Fi direct, D2D communication of LTE, or the like. In response to the reception of the identification information of the electronic device 110, the UE 120 may transmit the identification information of the UE 120 to the electronic device 110 through the server 125. In some embodiments, in response to the reception of the identification information of the electronic device 110, the UE 120 may directly transmit the identification information of the UE 120 to the electronic device 110. The processor 220 may recognize that the user is positioned close to the electronic device 110 based on the received identification information of the UE 120.

The processor 220 may recognize whether or not the user is positioned close by using the sensor 210. The processor 220 may recognize the approach of the user through the sensor (e.g., a camera or an image sensor) 210. Through the identification information of the UE 120, the processor 220 may more easily recognize the user. For example, when the processor 220 receives the identification information of the UE 120 through the other electronic device 115 that is installed at the store entrance, the processor 220 may more easily recognize the user contained in an image that is obtained through the sensor. This is due to the fact that the candidate group of users may be limited to the users whose identification information of the UE 120 is received.

If the user and the object are positioned close to each other, the processor 220 may collect state information of the user. The state information of the user may be a reaction of the user with respect to the object.

For example, the processor 220 may extract the user's facial area from an image that is obtained through the sensor 210. As another example, the processor 220 may extract the user's voice from voice data that is obtained through the sensor 210. As another example, the processor 220 may extract the shape of the user from the image that is obtained through the sensor 210. As another example, through the analysis of the image that is obtained through the sensor 210, the processor 220 may detect that the user's gaze focuses on a specific part. As another example, the processor 220 may detect an increase in the body temperature of the user through the sensors 210.

The processor 220 may receive state information of the user from the UE 120. The state information of the user may be information that is obtained through the sensor included in the UE 120. The state information of the user may contain a user's emotion for the object. The user's emotion for the object may be expressed as information on the object. For example, if the user is wearing or carrying the object, the state information of the user may be the heart rate of the user, which is detected through the sensor included in the UE 120. The processor 220 may obtain the state information of the user, which is detected through the sensor 210, and may obtain the state information of the user, which is contained in the UE 120, in order to thereby more accurately analyze the user's emotion for the object.

The processor 220 may make a request to the server 125 for data in order to process (or analyze) the state information of the user. The data may contain the past object transaction history of the user. The data may contain the user's preference for the object. The data may contain information for analyzing the user's emotion. For example, the data may contain information or commands necessary for a variety of algorithms to analyze the obtained state information of the user. In response to the request for the data on the state information of the user, the server 125 may transmit, to the electronic device 110, the data on the state information of the user. The processor 220 may receive, from the server 125, the data on the obtained state information of the user.

The processor 220 may create information on the object based on: the state information of the user, which is detected through the sensor 210; the state information of the user, which is obtained through the UE 120; and/or the data on the state information of the user, which is received from the server 125.

The processor 220 may create the information on the object based on the user's facial area, which is detected or extracted. The processor 220 may extract the shape of eyes, a mouth, or the like, and a protruding position thereof, from the detected facial area of the user. The processor 220 may identify wrinkles of the skin and concave/convex portions of the surface thereof in the user's facial area. The processor 220 may determine a plurality of indicators for the areas around a mouth, eyes, eyebrows, or a jaw based on the area extracted from the user's facial area and based on the identified area. The processor 220 may convert the determined indicators in various ways in order to thereby create the information on the object.

For example, the processor 220 may identify the user's facial expression from the user's facial area. The processor 220 may analyze, through the identified facial expression of the user, whether the user makes a grimace, or whether the user worries about the object. The processor 220 may create the information on the object based on the analyzed results. The information on the object may be information on the user's preference for the object or information on whether the user is not satisfied with a specific part of the object. The information on the object may be used to predict whether or not the user will purchase the object. For example, the processor 220 may display, on the display 215, a message that is related to at least one of the object or the user based on the information on the object.

As another example, the processor 220 may convert the shape of the user, which is detected or extracted, into a skeleton. The processor 220 may analyze the spatial distribution of joints of the converted skeleton based on root joints of the converted skeleton. The processor 220 may create the information on the object based on the directions, positions, motions of the analyzed joints.

As another example, the processor 220 may analyze the user's voice, which is detected or extracted. If the extracted voice contains negative expressions for the object, the processor 220 may extract the negative expressions or words for the object from the extracted voice. The processor 220 may analyze whether or not the negative expressions or words relate to the object. If it is analyzed that the negative expressions or words relate to the object, the processor 220 may create the information on the object, which contains information stating that the user is not satisfied with the object.

The processor 220 may transmit the information on the object to the server 125. The processor 220 may transmit, to the server 125, the information on the object in order to update the information on the user and the object in the server 125. In response to the reception of the information on the object, the server 125 may store the information on the object. The server 125 may classify the information on the object according to a determined criterion to then be stored.

The processor 220 may display a message that is related to at least one of the object or the user based on the information on the object. For example, if the information on the object contains information stating that the user is satisfied with the object but is dissatisfied with the price of the object, the processor 220 may display, on the display 215, information for the purchase of the object (e.g., coupon information, ticket information, or the like) in order to induce the purchase of the object. As another example, if the information on the object contains information stating that some of the design of the object does not match the user, the processor 220 may display, on the display 215, information on the object of a design that is similar to the object and that the user may prefer.

The processor 220 may transmit, to the UE 120, a message that is related to at least one of the object or the user based on the information on the object. In response to the reception of the message that is related to at least one of the object or the user, the UE 120 may display the message that is related to at least one of the object or the user. For example, if the user leaves the store without purchasing the object, the processor 220 may transmit, to the UE 120, a message that contains a list of other objects.

The memory 225 may store control command codes for controlling the electronic device 110, control data, or user data. The memory 225 may include at least one of a volatile memory or a non-volatile memory. The non-volatile memory may include a read only memory (ROM), a programmable ROM (PROM), an electrically programmable ROM (EPROM), an electrically erasable PROM (EE-PROM), a flash memory, a phase change random access memory (PRAM), a magnetic RAM (MRAM), a resistive RAM (RRAM), or a ferroelectric RAM (FRAM). The volatile memory may include at least one of various memories, such as a dynamic RAM (DRAM), a static RAM (SRAM), a synchronous DRAM (SDRAM), a PRAM, an MRAM, an RRAM, an FRAM, or the like.

The memory 225 may include a non-volatile medium, such as a hard disk drive (HDD), a solid state disk (SSD), an embedded multi-media card (eMMC), or a universal flash storage (UFS). The memory 225 may store sensing information that is obtained through the sensor 210.

Figure 3:
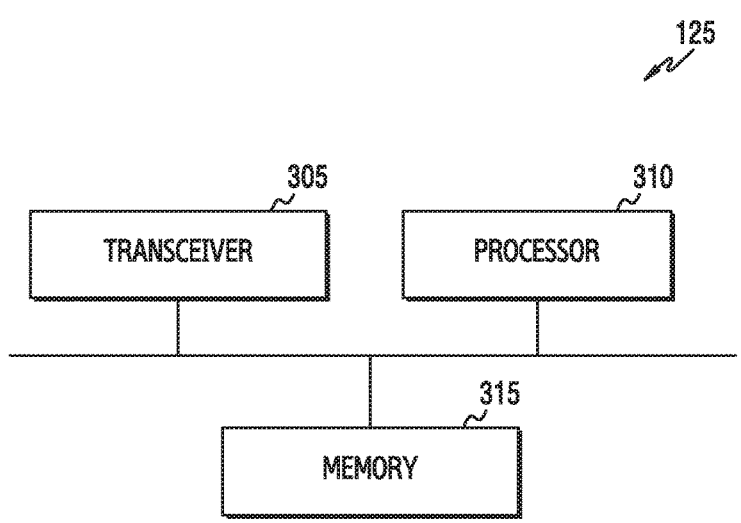
FIG. 3 illustrates a functional block diagram of a server according to various embodiments of the present disclosure.

FIG. 3 illustrates a functional block diagram of a server according to various embodiments of the present disclosure. The block configuration may be included in the server 125 shown in FIG. 1.

Referring to FIG. 3, the server 125 may be located in the store of the network environment 100. In some embodiments, the server 125 may be located outside the store of the network environment 100. In some embodiments, the server 125 may be operationally, or physically, combined with the electronic device 110. The server 125 may include a transceiver 305, a processor 310, and a memory 315.

The transceiver 305 may set telecommunication or short-range communication between the server 125 and external devices. For example, the transceiver 305 may perform telecommunication with external devices through the communication standards or multiple access schemes that the transceiver 205 uses. As another example, the transceiver 305 may perform short-range communication with external devices through short-range communication schemes that the transceiver 205 uses.

The transceiver 305 may be configured to be similar to the transceiver 205.

The processor 310 may control the overall operations of the server 125. In some embodiments, the processor 310 may include a single-core processor or a multiple-core processor. For example, the processor 310 may include a multi-core processor, such as a dual-core processor, a quad-core processor, a hexa-core processor, or the like. According to some embodiments, the processor 310 may further include a cache memory that is positioned inside, or outside, the same.

The processor 310 may: receive commands from other elements of the server 125; interpret the received commands; and perform a calculation or the processing of data according to the interpreted commands.

The processor 310 may process data or signals that are created or generated according to a request of the electronic device 110. For example, the processor 310 may make a request to the memory 315 for data or signals in order to respond to the request of the electronic device 110. The processor 310 may record (or store), or update, data or signals in the memory 315 in order to respond to the request of the electronic device 110.

The processor 310 may interpret and process messages, data, or signals received from the transceiver 305. The processor 310 may create new messages, data, or signals based on the received messages, data, or signals.

The processor 310 may receive or transmit a variety of information in order to assist the electronic device 110.

The processor 310 may receive the identification information of the UE 120 from the UE 120 that enters the store. The identification information of the UE 120 may be information for indicating the user who enters the store. The processor 310 may transmit the identification information of the UE 120 to the electronic device 110. The operation of transmitting the identification information of the UE 120 may be an operation to inform the electronic device 110 of the user who enters the store.

The processor 310 may receive the identification information of the UE 120 from the UE 120 that is positioned close to the other electronic device 115. The identification information of the UE 120 may be information to indicate the user who is positioned close to the electronic device 110. The processor 310 may transmit the identification information of the UE 120 to the electronic device 110. The operation of transmitting the identification information of the UE 120 may be an operation to inform the electronic device 110 of the user who is positioned close to the electronic device 110.

The processor 310 may receive the identification information of the object from the other electronic device 115, which has detected the state change of the object. The identification information of the object may be information to indicate: the object that the user is interested in; that the user carries, or wears, the object; or that the user touches the object. The processor 310 may transmit the identification information of the object to the electronic device 110. The operation of transmitting the identification information of the object may be an operation to inform the electronic device 110 that the user may approach while carrying the object.

The processor 310 may receive, from the electronic device 110, a request for data related to the state information of the user. The state information of the user may be information on the user's reaction in relation to the object. The data related to the state information of the user may be data that is required to create the information on the object based on the state information of the user. For example, the data related to the state information of the user may contain the past purchase history of the user, the user's disposition, or the user's reaction when the user visited the store in the past. The data related to the state information of the user may contain a group of: functions; commands; or data, which are necessary to create the information on the object. The processor 310 may transmit, to the electronic device 110, data that is related to the state information of the user. The operation of transmitting the data related to the state information of the user may be an operation to assist the electronic device 110 in creating the information on the object.

The processor 310 may receive a purchase message or a non-purchase message from the electronic device 110. The purchase message may indicate that the user has purchased the object. The non-purchase message may indicate that the user has not purchased the object. The operation of receiving the purchase message or the non-purchase message may be an operation to update the data stored in the server 125 according to a determined criterion.

The processor 310 may classify and store the message received from the electronic device 110 according to a determined criterion. The received message may contain the state information of the user, which is detected by the electronic device 110 or the UE 120. The received message may contain information on whether or not the user has purchased the object. The received message may contain information on a change in the user's disposition for purchase. The processor 310 may store the message for the analysis of the state information of the user. The processor 310 may process and store the message for the analysis of the state information of the user. The processor 310 may store the message for updating the stored information.

The processor 310 may transmit a feedback message to the manufacturer based on the information stored in the server 125. For example, the processor 310 may transmit, to the manufacturer, a feedback message that contains information that specifies the portion of the object that the user does not currently prefer.

The processor 310 may transmit an advertisement message to the UE 120 based on the information stored in the server 125. For example, if the portion, which the user does not prefer, is improved, the processor 310 may transmit, to the UE 120, an advertisement message stating that the improved object will be released or has been released.

The memory 315 may store control command codes for controlling the server 125, control data, or user data.

The memory 315 may be configured to be similar to the memory 225.

The memory 315 may store commands, functions, or data for analysis of the state information of the user of the electronic device 110, the feedback message for the manufacturer, or the advertisement message for the user. The memory 315 may store information, such as the user's purchase history or the user's disposition.

Figure 4:
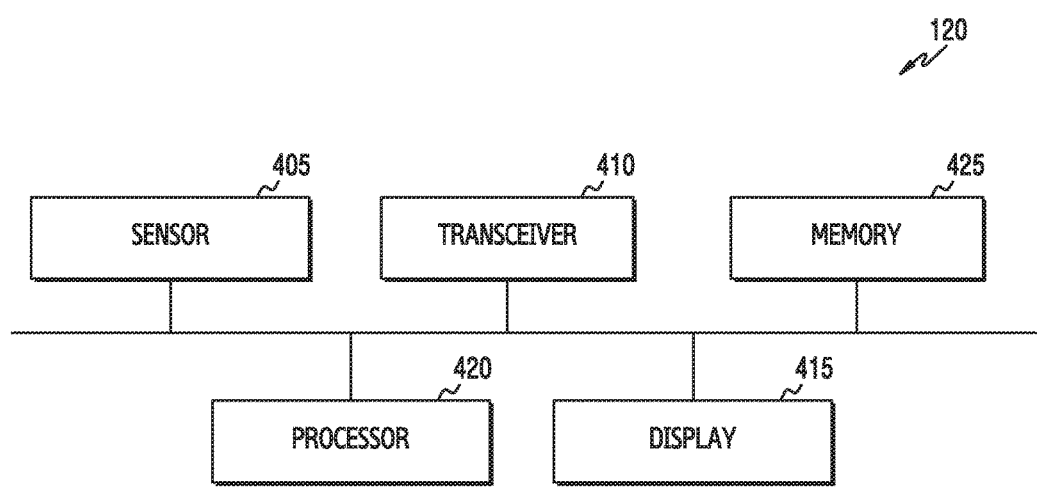
FIG. 4 illustrates a functional block diagram of a user equipment (UE) according to various embodiments of the present disclosure.

FIG. 4 illustrates a functional block diagram of the UE according to various embodiments of the present disclosure. The block configuration may be included in the UE 120 shown in FIG. 1.

Referring to FIG. 4, the UE 120 may include a sensor 405, a transceiver 410, a display 415, a processor 420, and a memory 425.

The sensor 405 may sense the external environment of the UE 120 and the state of the user who uses the UE 120. The sensor 405 may be a group of a plurality of sensors.

In some embodiments, the sensor 405 may be a sensor for sensing the user's heart rate. In some embodiments, the sensor 405 may be a sensor for detecting the user's blood pressure. In some embodiments, the sensor 405 may be a sensor for detecting the user's voice.

The transceiver 410 may set telecommunication or short-range communication between the UE 120 and external devices. For example, the transceiver 410 may perform telecommunication with external devices through the communication standards or multiple access schemes that the transceiver 205 uses. As another example, the transceiver 410 may perform short-range communication with external devices through short-range communication schemes that the transceiver 205 uses.

The transceiver 410 may be configured to be similar to the transceiver 205.

The display 415 may output data or signals. For example, the display 415 may display image signals that are processed by the processor 420. The display 415 may display captured or still images, or may display videos or camera preview images. The display 415 may be an LCD or an OLED.

The display 415 may be configured to be integrated as a touch screen by being combined with an input/output device.

The display 415 may display a message that is related to at least one of: the object that is created based on the information on the object, which is received from the electronic device 110; or the user. The display 415 may display advertisement messages that are received from the server 125.

The processor 420 may control the overall operations of the UE 120. The processor 420 may execute applications that provide Internet browsers, games, images, or the like. In some embodiments, the processor 420 may include a single-core processor or a multi-core processor. For example, the processor 420 may include a multi-core processor, such as a dual-core processor, a quad-core processor, a hexa-core processor, or the like. According to some embodiments, the processor 420 may further include a cache memory that is positioned in the inside or on the outside.

The processor 420 may: receive commands from other elements of the UE 120; interpret the received commands; and perform a calculation or the processing of data according to the interpreted commands.

The processor 420 may process data or signals that are created or generated in the applications. For example, the processor 420 may make a request to the memory 425 for data or signals for the applications. The processor 420 may record (or store), or update, data or signals in the memory 425 for the applications.

The processor 420 may interpret and process messages, data, or signals received from the transceiver 410. The processor 420 may interpret and process messages, data, or signals received from the sensor 405. The processor 420 may create new messages, data, or signals based on the received messages, data, or signals. The processor 420 may provide the display 415 with the processed or created messages, data, or signals.

The processor 420 may be operationally combined with other elements (e.g., the sensor 405, the transceiver 410, the display 415, or the memory 425) in the UE 120.

The processor 420 may receive the identification information of the other electronic device 115 from the other electronic device 115 that is installed at the entrance of the store. The UE 120 may be a device in which an application related to the identification information of the other electronic device 115 is installed. In some embodiments, the UE 120 may also install the application related to the identification information of the other electronic device 115 in response to the reception of the identification information of the other electronic device 115.

In response to the reception of the identification information of the other electronic device 115, the processor 420 may transmit the identification information of the UE 120 to the server 125. The operation of transmitting the identification information of the UE 120 may be an operation to inform the server 125, or the electronic device 110 through the server 125, that the UE 120 has entered the store. The operation of transmitting the identification information of the UE 120 may be an operation to verify that the electronic device 110 collects the state information of the user of the UE 120. For example, the user of the UE 120 may agree with the collection of the state information of the user in the process of installing, in the UE 120, an application related to the store that the user has entered. The operation of transmitting the identification information of the UE 120 may be an operation to easily determine whether or not the user has approached the electronic device 110. This is due to the fact that it is enough for the electronic device 110 to determine the approach of the user only with respect to the users who are determined to have entered the store.

The processor 420 may receive the identification information of the electronic device 110 from the electronic device 110. The operation of receiving the identification information of the electronic device 110 may be an operation to determine whether or not the UE 120 is positioned close to the electronic device 110. The electronic device 110 may transmit the identification information of the electronic device 110 in a designated cycle. When the UE 120 is positioned within the coverage area of the electronic device 110 (that is, when the UE 120 is positioned close to the electronic device 110), the processor 420 may receive the identification information of the electronic device 110 from the electronic device 110.

In response to the reception of the identification information of the electronic device 110, the processor 420 may transmit the identification information of the UE 120 to the server 125. In some embodiments, the processor 420 may directly transmit the identification information of the UE 120 to the electronic device 110. The operation of transmitting the identification information of the UE 120 may be an operation to inform the electronic device 110 that the UE 120 is positioned close thereto. In other words, the operation of transmitting the identification information of the UE 120 may be an operation to inform the electronic device 110 of the approach of the user.

The processor 420 may collect the state information of the user of the UE 120 by using the sensor 405. In some embodiments, the processor 420 may collect the state information of the user of the UE 120 by using the sensor 405 while transmitting the identification information of the UE 120 to the server 125 or the electronic device 110. In some embodiments, if a request for the collection of the state information of the user is received from the electronic device 110, the processor 420 may collect the state information of the user by using the sensors 405.

For example, the processor 420 may control the sensors 405 to measure the user's heart rate. If the user who carries or wears the object is satisfied with the object, the user's heart rate will increase. The processor 420 may recognize the increased heart rate of the user through the sensor 405. The processor 420 may obtain the user's heart rate through the sensor 405 in order to thereby assist the electronic device 110 in collecting the state information of the user.

As another example, the processor 420 may control the sensor 405 to obtain the user's voice data. The voice of the user who carries, or wears, the object may contain the information on the object. The processor 420 may obtain the user's voice data through the sensor 405 in order to thereby assist the electronic device 110 in collecting the state information of the user.

The processor 420 may make a control to transmit the collected state information of the user to the electronic device 110. The processor 420 may make a control to transmit the collected state information of the user to the electronic device 110 in order to assist the electronic device 110 in collecting the state information of the user. The operation of transmitting the collected state information of the user to the electronic device 110 may be required for the electronic device 110 to more accurately create the information on the object. In some embodiments, the operation of collecting the state information of the user and the operation of transmitting the collected state information of the user, by the processor 420, may be omitted.

The processor 420 may make a control to receive, from the electronic device 110, information that is related to the object or the user. The information related to the object or the user may contain messages, voices, or images, which are created by the electronic device 110, based on the information on the object. The information related to the object or the user may contain discount coupon information related to the object, a discount period of the object, the number of purchaser for the object, or the like. The message related to the object or the user may contain the user's past purchase history in relation to the object, the user's anniversary, or the like.

In response to the reception of the message related to the object or the user, the processor 420 may display, on the display 415, the message related to the object or the user. The displayed message related to the object or the user may contain images as well as text. The displayed message related to the object or the user may be a message to: induce the user to purchase the object; survey the user's disposition; or provide a new offer to the user.

The memory 425 may store control command codes for controlling the UE 120, control data, or user data.

The memory 425 may be configured to be similar to the memory 225.

Figure 5:
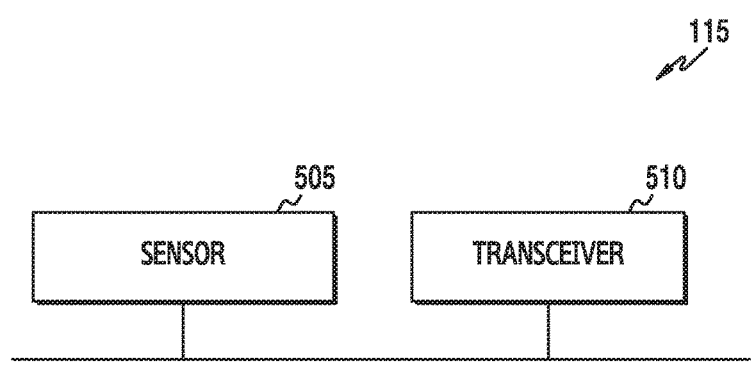
FIG. 5 illustrates a functional block diagram of the other electronic device according to various embodiments of the present disclosure.

FIG. 5 illustrates a functional block diagram of the other electronic device according to various embodiments of the present disclosure. The block configuration may be included in the other electronic device 115 shown in FIG. 1.

Referring to FIG. 5, the other electronic device 115 may be fixedly installed at the store entrance in order to determine whether or not the UE 120 enters the store (in other words, whether or not the user enters the store). In addition, the other electronic device 115 may correspond to an object in the store. For example, if the object is clothing, the other electronic device 115 may be a device that is installed in the hanger. As another example, if the object is an electronic product, the other electronic device 115 may be a device that is inserted into a tag that is attached to the electronic product. As another example, the other electronic device 115 may be installed in the showcase in which the object is displayed. The other electronic device 115 may be a fixed device that is limited to a specific place, or may be a mobile device to be movable depending on the usage. For example, the other electronic device 115 may be a beacon device that is fixedly installed, or may be a beacon device that is movable. As another example, the other electronic device 115 may be a detection device that is fixedly installed, or may be a detection device that is movable.

The other electronic device 115 may include a sensor 505 and/or a transceiver 510.

The sensor 505 may sense a change in the state of the corresponding object. The sensor 505 may be a group of a plurality of sensors. For example, the sensor 505 may sense whether or not the user is close to the object through a proximity sensor. As another example, the sensor 505 may sense the motion of the object according to the user's reaction through a gyro sensor or an acceleration sensor. As another example, the sensor 505 may sense a user's touch (such as, a hand touch or a finger touch) through a proximity sensor or a touch recognition sensor.

The transceiver 510 may transmit the identification information of the other electronic device 115. If the other electronic device 115 is installed at the store entrance, the transceiver 510 may transmit the identification information of the other electronic device 115 to the UE 120 that enters the store. In order for the electronic device 110 to recognize the UE 120 entering the store, the transceiver 510 may transmit the identification information of the other electronic device 115 according to a designated cycle.

The transceiver 510 may transmit the identification information of the object. In some embodiments, in the case where the other electronic device 115 is installed to correspond to the object, the transceiver 510 may transmit the identification information of the object to the electronic device 110. In order to inform the electronic device 110 that the object is positioned close to the electronic device 110, the transceiver 510 may transmit the identification information of the object according to a designated cycle. In some embodiments, in the case where the other electronic device 115 is installed in the showcase of the object to correspond to the object, the transceiver 510 may transmit the identification information of the object to the electronic device 110 in response to a change in the state of the corresponding object. In order to inform the electronic device 110 that the object may be positioned close to the electronic device 110, the transceiver 510 may transmit the identification information of the object in response to a change in the state of the corresponding object.

As described above, a digital media device, according to various embodiments, may include: a processor; a transceiver configured to be operationally connected with the processor; and a sensor configured to be operationally connected with the processor, wherein the processor may be configured to: receive identification information of an object when an event occurs; obtain state information of a user corresponding to the object; and create information on the object based on the state information. The event may contain the case where at least one of: the other electronic device; the object; one or more users; or the UE is positioned within a specific distance of the electronic device 110. For example, the event may be recognized through the object or the camera. As another example, the event may contain the case where the other electronic device or the UE, which corresponds to the object, is positioned within a communication-available range or within a determined range according to the transmitted signal strength.

In addition, the event may include the case where the motion of the object is detected.

In addition, the event may include the case where a user's touch with respect to the object is detected.

In addition, one or more users may be provided.

In addition, the state information of the user may contain at least one of: the user's voice information, the user's facial expression information, the user's heart rate, the user's brain waves, the user's gesture information; or the user's motion information.

In addition, the processor may be configured to obtain the state information of the user through a sensor that is included in the electronic device.

In addition, the processor may be configured to obtain the state information of the user from the UE, and the state information of the user may be created through a sensor that is included in the UE.

In addition, the processor may be further configured to display a message that is related to at least one of the object or the user based on at least one of the reaction information with respect to the object or the state information of the user.

In addition, the processor may be further configured to obtain purchase information indicating whether or not the user has purchased the object, and may be further configured to classify and store the information on the object according to the purchase information.

In addition, the state information of the user may contain a voice signal of the user. The processor may be configured to: convert the voice signal of the user into an input matrix; extract a characteristic vector from the voice signal of the user by using the converted input matrix; compare the characteristic vector with a reference vector; if the characteristic vector is related to the reference vector, determine the emotional state of the user for the object based on the reference vector; and create the information on the object based on the emotional state for the object.

In addition, the state information of the user may contain image data of the user's face, and the processor may be configured to: determine the user's emotion with respect to an object corresponding to the related reference pattern if a change pattern of the image data for the user's face is related to one of a plurality of reference patterns; and create information on the object based on the determined user's emotion.

In addition, the state information of the user may contain image data of the user's gesture, and the processor may be configured to: convert the image data of the user's gesture into a skeleton; determine the user's emotion with respect to an object corresponding to the related reference pattern if a change pattern of the skeleton is related to one of a plurality of reference patterns; and create information on the object based on the determined user's emotion.

In addition, the state information of the user may contain a voice signal of the user, and the processor may be configured to: analyze beginning and latter parts of a word that matches the reference word in the voice signal if the voice signal of the user contains at least one of a plurality of reference words; identify the user's intention through the analyzed parts; and create information on the object based on the identified user's intention.

Figure 6:
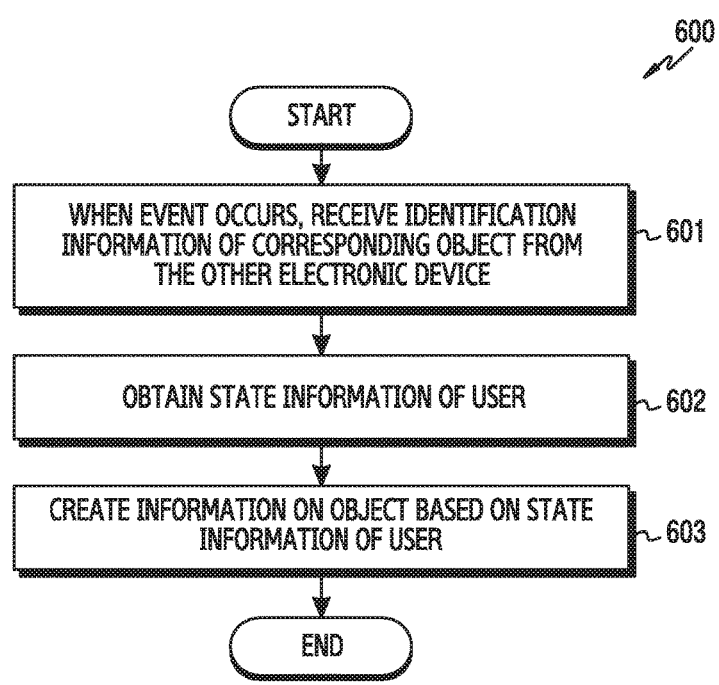
FIG. 6 is a flowchart illustrating an operation of the electronic device according to various embodiments of the present disclosure.

FIG. 6 is a flowchart illustrating an operation of the electronic device according to various embodiments of the present disclosure. The operation above may be performed by the electronic device 110 shown in FIG. 1.

Referring to FIG. 6, the operational flow 600 may include operation 601, operation 602, and/or operation 603.

In operation 601, when an event occurs, the electronic device 110 may receive, from the other electronic device 115, identification information of an object corresponding to the other electronic device 115. The object corresponding to the other electronic device 115 may be an object that is physically coupled to the other electronic device 115. The object corresponding to the other electronic device 115 may be an object that is operationally, or communicatively, connected with the other electronic device 115.

The event may be defined to be the case where the other electronic device 115 and the UE 120 are positioned in a designated area. In this case, the electronic device 110 may recognize that the other electronic device 115 and the UE 120 are positioned in a designated area through signals that are transmitted by the other electronic device 115 and/or the UE 120 through short-range communication.

In some embodiments, the event may be defined to be the case where a change in the state of the object is detected. The change in the state of the object may be detected by the sensor 505, which is included in the other electronic device 115. For example, the change in the state of the object may contain the motion of the object by the user or the generation of a user's touch (e.g., a hand touch or a finger touch) with respect to the object. If there is a change in the state of the object, the electronic device 110 may directly receive, from the other electronic device 115, the identification information of the object of which the state change has been detected. Alternatively, the electronic device 110 may receive, from the server 125, the information on the object of which the state change has been detected. The information on the detected object may be based on the identification information of the object that is transmitted from the other electronic device 115 to the server 125.

In operation 602, the electronic device 110 may obtain state information of the user. The state information of the user may be obtained through the sensor 210 that is included in the electronic device 110. The state information of the user may be received from the UE 120. The state information of the user may contain the user's reaction with respect to the object. For example, the state information of the user may contain information stating: that the user keeps an eye on a specific area of the object; the heart rate of the user who wears the object becomes fast; that the user has a positive conversation with a companion about the object; or that the user makes a grimace upon holding the object.

In operation 603, the electronic device 110 may create information on the object based on the identification information of the object and the state information of the user. The information on the object may contain the user's emotion for the object. For example, if the user prefers the object after wearing the same, the electronic device 110 may create the information on the object, which states that the user prefers the object. The electronic device 110 may obtain something in common with the users who have purchased the object, discount information about the object, or the characteristic of the object through the identification information of the object. The electronic device 110 may obtain information about the user's emotions for the object through the state information of the user. The electronic device 110 may create the information on the object based on the obtained information. The information on the object may include reaction information with respect to the object. The reaction information to the object may be created by utilizing at least one of the identification information of the object or the state information of the user. The reaction information on the object may indicate that the user wishes to purchase the object or the user does not want to purchase the same in response to the object. In addition, the electronic device 110 may determine whether the user wishes to purchase the object or the user does not want to purchase the same based on the analysis of the state information of the user with respect to the identified object, and if the user does not want to purchase the object, the electronic device 110 may provide the user with information that induces the user to purchase the object.

The electronic device, according to various embodiments, may create the information on the object through the identification information of the object and the state information of the user. The information on the object may be information to induce the purchase by the user. The information on the object may be information to provide feedback to the manufacturer of the object. The electronic device may create the information on the object in order to thereby provide more flexible services to the user or the manufacturer. The electronic device may create the information on the object in order to thereby more quickly provide services to meet the consumer's tendencies, which vary quickly.

Figure 7:
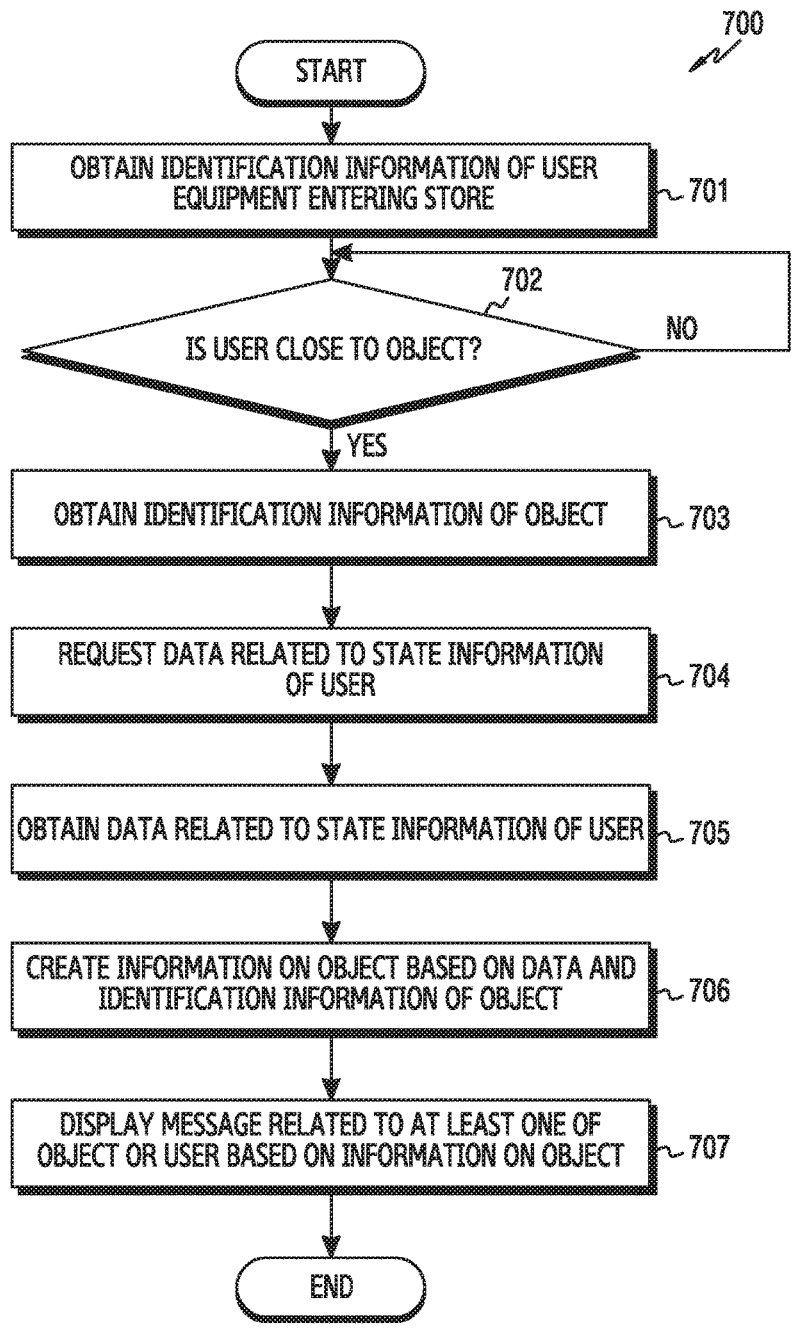
FIG. 7 is a flowchart illustrating another operation of the electronic device according to various embodiments of the present disclosure.

FIG. 7 is a flowchart illustrating another operation of the electronic device according to various embodiments of the present disclosure. The operation above may be performed by the electronic device 110 shown in FIG. 1.

Referring to FIG. 7, the operational flow 700 may include operation 701, operation 702, operation 703, operation 704, operation 705, operation 706, and/or operation 707.

In operation 701, the electronic device 110 may obtain identification information of the UE 120 that enters the store. The electronic device 110 may obtain, from the server 125, the identification information of the UE 120 that enters the store. In some embodiments, the electronic device 110 may directly obtain, from the UE 120, the identification information of the UE 120. The identification information of the UE 120 may be information to inform of the entry of the UE 120 into the store. The UE 120, which is carried by the user who enters the store, may receive the identification information of the other electronic device 115 from the other electronic device 115 that is installed at the store entrance. In response to the reception of the identification information of the other electronic device 115, the UE 120 may transmit the identification information of the UE 120 to the server 125. In some embodiments, the UE 120 may directly transmit the identification information of the UE 120 to the electronic device 110. The electronic device 110 may receive the identification of the UE 120 from the server, or may directly receive the identification information of the UE 120 from the UE 120.

In operation 702, the electronic device 110 may determine whether or not the user and the object are positioned close to the electronic device 110. In other words, the electronic device 110 may determine whether or not the user and the object are positioned in a designated area. The designated area may vary depending on a given environment. The electronic device 110 may adaptively control the range of the designated area according to a given environment. For example, the electronic device 110 may control transmission power in order to thereby control the range of the designated area.

The electronic device 110 may determine whether or not the user and the object are positioned close through the identification information of the object, which is transmitted by the other electronic device 115 corresponding to the object, and the identification information of the electronic device 110, which is transmitted by the electronic device 110. In some embodiments, if the identification information of the object is received from the other electronic device 115 corresponding to the object, the electronic device 110 may determine that the object is positioned close to the electronic device 110 or is positioned within a designated area. In some embodiments, the electronic device 110 may receive the identification information of the electronic device 110 from the UE 120. In response thereto, the electronic device 110 may transmit the identification information of the UE 120 to the electronic device 110 through the server 125. In addition, the electronic device 110 may directly transmit the identification information of the UE 120 to the electronic device 110. In this case, the electronic device 110 may determine that the user is positioned close to the electronic device 110 or is positioned within a designated area. In some embodiments, if an image, which is obtained through the sensor 210 included in the electronic device 110, contains the object, the electronic device 110 may determine that the object is positioned close to the electronic device 110 or is positioned within a designated area. In some embodiments, if an image, which is obtained through the sensor 210, contains the user, the electronic device 110 may determine that the user is positioned close to the electronic device 110 or is positioned within a designated area.

If no user or object approaches the electronic device 110, the electronic device 110 may repeat operation 702.

In operation 703, the electronic device 110 may obtain the identification information of the object. The electronic device 110 may receive, from the other electronic device 115, the identification information of the object corresponding to the other electronic device 115. In some embodiments, the other electronic device 115 may broadcast the identification information of the object in a designated cycle for the detection of the adjacent electronic device 110. The electronic device 110 may receive the identification information of the object in order to identify the object that is positioned close to the electronic device 110.

In operation 704, the electronic device 110 may make a request to the UE 120 or the server 125 for data that is related to the state information of the user. In some embodiments, in the case where the electronic device 110 adopts the same database as the server 125, operation 704 may be omitted, or may be performed by a signal flow in the electronic device. In order to create reliable information on the object, the electronic device 110 may make a request to the UE 120 or the server 125 for data that is related to the state information of the user. The operation of requesting the data may be an operation to call for functions or commands to derive the user's emotion for the object from the state information of the user. The operation of requesting the data may be an operation to call for the information of the user or data on the customer's preference for obtaining the information on the object from the state information of the user.

In operation 705, the electronic device 110 may obtain data that is related to the state information of the user. For example, the electronic device 110 may receive the requested data from the UE 120 or the server 125. The UE 120 or the server 125 may provide the requested data to assist the electronic device 110. In some embodiments, the state information of the user may be obtained through the sensor 210 that is included in the electronic device 110.

In operation 706, the electronic device 110 may create the information on the object based on the received data and the identification information of the object. The electronic device 110 may derive the characteristics of the object, the purchase history of the object, the properties of the object, or the relationship between the object and the consumers through the identification information of the object. The electronic device 110 may derive a user's thought of the object or the user's preference for the object through the received data. The electronic device 110 may create the information on the object by combining the derived information, characteristics, preference, or the like. The information on the object may contain the user's preference for the object or information on whether there is a portion with which the user is not satisfied in the object.

In operation 707, the electronic device 110 may display a message that is related to at least one of the object or the user based on the information on the object. For example, if the information on the object contains information stating that the user is dissatisfied with the price of the object, the electronic device 110 may display a message for discount information on the object or a method thereof, or may display a message for a discount period of the object to the user in order to induce the user's purchase.

The electronic device 110, according to various embodiments, may adaptively provide the information on the object to the user by using communication technology and sensor technology. The electronic device 110 may adaptively display a message that is helpful for the purchase of the object to the user by using communication technology and sensor technology.

Figure 8:
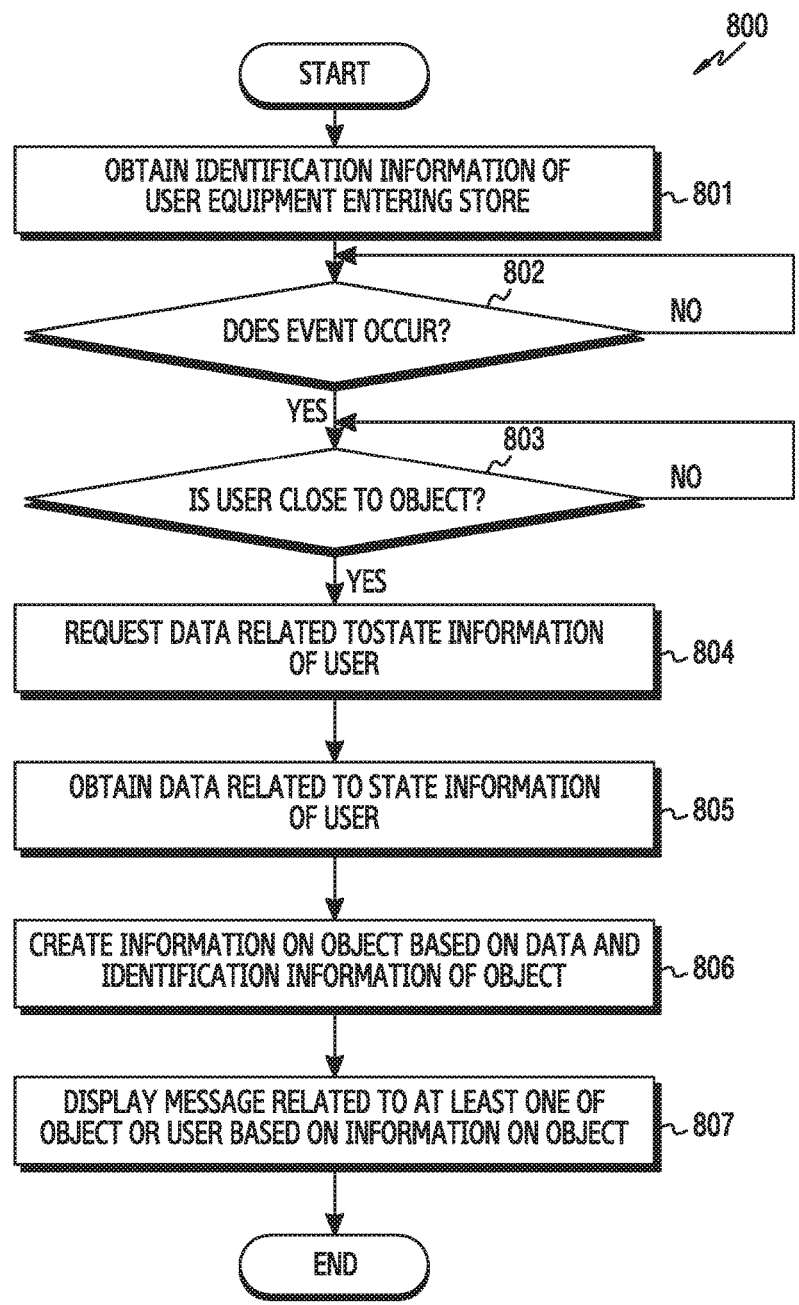
FIG. 8 is a flowchart illustrating another operation of the electronic device according to various embodiments of the present disclosure.

FIG. 8 is a flowchart illustrating another operation of the electronic device according to various embodiments of the present disclosure. The operation above may be performed by the electronic device 110 shown in FIG. 1.

Referring to FIG. 8, the operational flow 800 may include operation 801, operation 802, operation 803, operation 804, operation 805, operation 806, and/or operation 807. Operation 801 and operations 803 to 807 may correspond to operation 701 and operations 703 to 707, respectively.

In operation 802, the electronic device 110 may determine whether or not an event has occurred. In some embodiments, if the other electronic device 115 detects a change in the state of the corresponding object, the electronic device 110 may determine that the event has occurred according to the following process. If a change in the state of the object corresponding to the other electronic device 115 is detected, the other electronic device 115 may transmit the identification information of the object to the server 125. The server 125 may transmit the identification information of the object to the electronic device 110. The electronic device 110 may recognize that the state has been changed in the object through the received identification information of the object.

If the event does not occur, the electronic device 110 may repeat operation 802.

The operational flow shown in FIG. 8 may be an example in which the other electronic device 115 is fixedly installed in the showcase of the object. If the other electronic device 115 is not able to be positioned close to the electronic device 110, the other electronic device 115 may detect a change in the state of the object corresponding to the other electronic device 115. The other electronic device 115, which is fixedly installed, may provide the identification information of the object to the electronic device 110 in order to thereby assist the electronic device 110 in easily recognizing the approach of the object. The electronic device 110 may easily determine whether or not the object is included in the image that is obtained through the sensor 210 by using the identification information of the object.

Figure 9A:
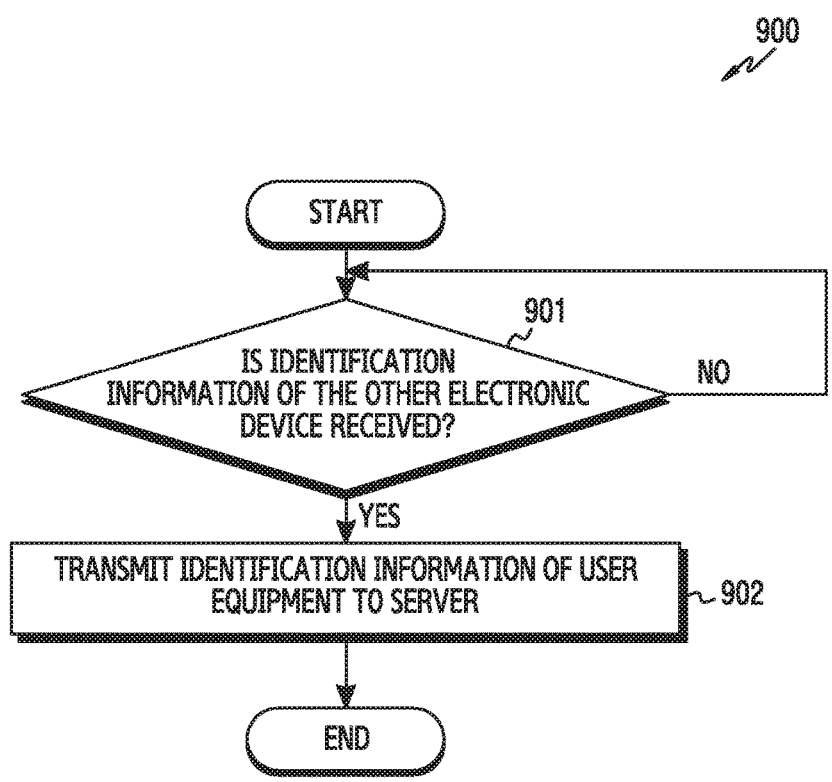
FIG. 9A is a flowchart illustrating an operation of the UE that enters the store according to various embodiments of the present disclosure.

FIG. 9A is a flowchart illustrating an operation of the UE that enters the store according to various embodiments of the present disclosure. The operation may be performed by the UE 120 shown in FIG. 1.

Referring to FIG. 9A, the operational flow 900 may include operation 901 and/or operation 902.

In operation 901, the UE 120 may determine whether or not the identification information of the other electronic device 115 is received. The UE 120 may determine whether or not the identification information of the other electronic device 115 is received from the other electronic device 115 that is installed at the entrance of the store. The other electronic device 115, which transmits the identification information of the other electronic device 115, may control the transmission power.

In operation 902, when the UE 120 receives the identification information of the other electronic device 115, the UE 120 may transmit the identification information of the UE 120 to the server 125. The UE 120 may transmit, by the automatic execution of an application that is pre-installed in the UE 120, the identification information of the UE 120 to the server 125 in response to the reception of the identification information of the other electronic device 115.

If the UE 120 does not receive the identification information of the other electronic device 115, the UE 120 may repeat operation 901. The fact that the UE 120 is not able to receive the identification information of the other electronic device 115 may mean that the UE 120 has not approached the store.

Figure 9B:
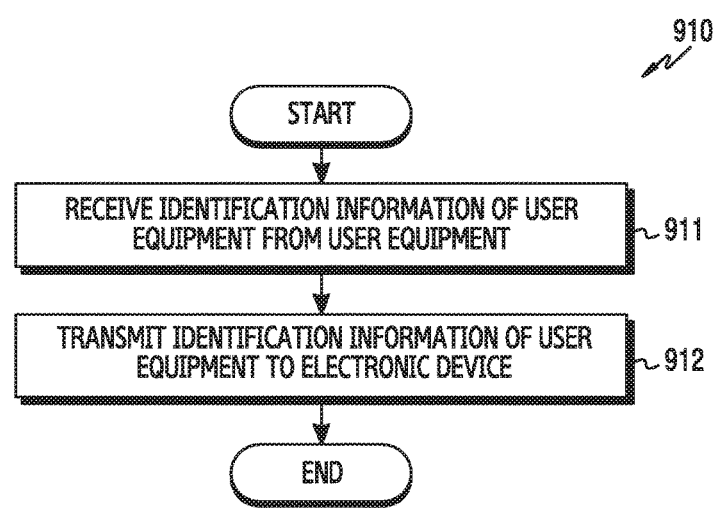
FIG. 9B is a flowchart illustrating an operation of the server to inform of the entry of the UE into the store according to various embodiments of the present disclosure.

FIG. 9B is a flowchart illustrating an operation of the server to inform of the entry of the UE into the store according to various embodiments of the present disclosure. The operation may be performed by the server 125 shown in FIG. 1.

Referring to FIG. 9B, the operational flow 910 may include operation 911 and/or operation 912.

In operation 911, the server 125 may receive the identification information of the UE 120 from the UE 120. The server 125 may recognize that the received identification information of the UE 120 is the information informing of the entry of the UE 120 into the store according to a predetermined criterion (for example, the rule between the UE 120 in which the application is installed and the server 125).

In operation 912, the server 125 may transmit the identification information of the UE 120 to the electronic device 110. The electronic device 110 may receive the identification information of the UE 120 from the server 125. The identification information of the UE 120 may be a message that informs that the user who wears, or carries, the UE 120 has entered the store. The electronic device 110 may recognize that the user (or the UE 120) has entered the store in order to thereby reduce the complexity for the control of the sensor. The operation of receiving the identification information of the UE 120 may be an operation of impliedly informing that the electronic device 110 collects the state information of the user from the UE 120.

Figure 9C:
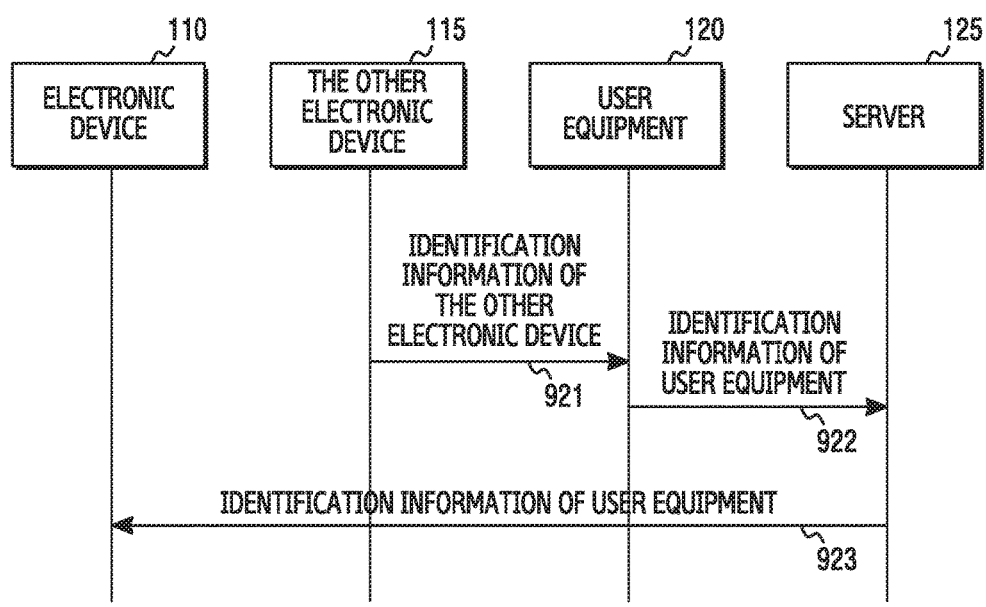
FIG. 9C illustrates a signal flow of a store entry process according to various embodiments of the present disclosure.

FIG. 9C illustrates a signal flow of a store entry process according to various embodiments of the present disclosure.

The signal flow may be generated in the electronic device 110, the other electronic device 115, the UE 120, and the server 125.

Referring to FIG. 9C, in operation 921, the other electronic device 115 installed at the store entrance may broadcast the identification information of the other electronic device 115 according to a designated cycle. The other electronic device 115 may control the transmission power in order to thereby adjust the broadcast range. When the UE 120 enters the broadcast range (for example, when the UE 120 approaches the store entrance), the UE 120 may receive the identification information of the electronic device 115.

In operation 922, in response to the reception of the identification information of the other electronic device 115, the UE 120 may transmit the identification information of the UE 120 to the server 125. The operation of transmitting the identification information for the UE 120 may be an operation that is preset or predefined during the course of installing the application in the UE 120. According to some embodiments, the UE 120 may directly transmit the identification information of the UE 120 to the electronic device 110. The server 125 may receive the identification information of the UE 120 from the UE 120.

In operation 923, the server 125 may transmit the identification information of the UE 120 to the electronic device 110. The electronic device 110 may receive the identification information of the UE 120 from the server 125. In some embodiments, the electronic device 110 may directly receive the identification information of the UE 120 from the UE 120. The electronic device 110 may recognize that the UE 120 (or the user) has entered the store through the reception of the identification information of the UE 120. In addition, the electronic device 110 may perform subsequent operations by considering that the UE 120 (or the user) is positioned in the store.

Figure 10A:
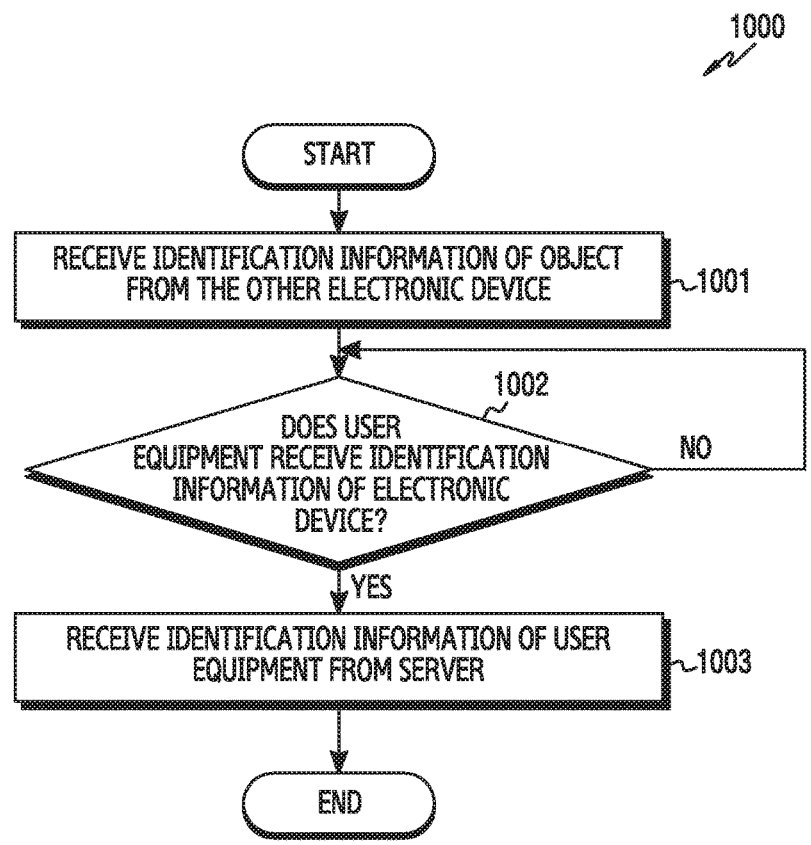
FIG. 10A is a flowchart illustrating an operation of the electronic device to determine the proximity of the user and the object according to various embodiments of the present disclosure.

FIG. 10A is a flowchart illustrating an operation of the electronic device to determine the proximity of the user and the object according to various embodiments of the present disclosure. The operation above may be performed by the electronic device 110 shown in FIG. 1.

Referring to FIG. 10A, the operational flow 1000 may include operation 1001, operation 1002, and/or operation 1003.

In operation 1001, the electronic device 110 may receive the identification information of the object from the other electronic device 115. The other electronic device 115 may broadcast the identification information of the object according to a designated cycle. The other electronic device 115 may adaptively control the transmission power of the identification information. When the other electronic device 115 is close to the electronic device 110, the electronic device 110 may receive the identification information of the object from the other electronic device 115.

In operation 1002, the electronic device 110 may determine whether or not the identification information of the electronic device 110 is received by the UE 120. The electronic device 110 may broadcast the identification information of the electronic device 110 according to a designated cycle in order to determine the approach of the UE 120. If the UE 120 is close to the electronic device 110, the UE 120 may receive the identification information of the electronic device 110 from the electronic device 110. If the UE 120 is not close to the electronic device 110 (in other words, If the user does not approach the electronic device 110 while carrying the object), the electronic device 110 may repeat operation 1002.

In operation 1003, if the UE 120 receives the identification information of the electronic device 110 (if the UE 120 or the user becomes close to the electronic device 110), the electronic device 110 may receive the identification information of the UE 120 from the server 125. In response to the reception of the identification information of the electronic device 110, the UE 120 may transmit the identification information of the UE 120 to the server 125. In response to the reception of the identification information of the UE 120, the server 125 may transmit the identification information of the UE 120 to the electronic device 110. The electronic device 110 may recognize that the UE 120 is positioned close to the electronic device 110 through the reception of the identification information of the UE 120. In some embodiments, the electronic device 110 may directly receive the identification information of the UE 120 from the UE 120 without passing through the server 125 in order to thereby recognize the approach of the UE 120.

Figure 10B:
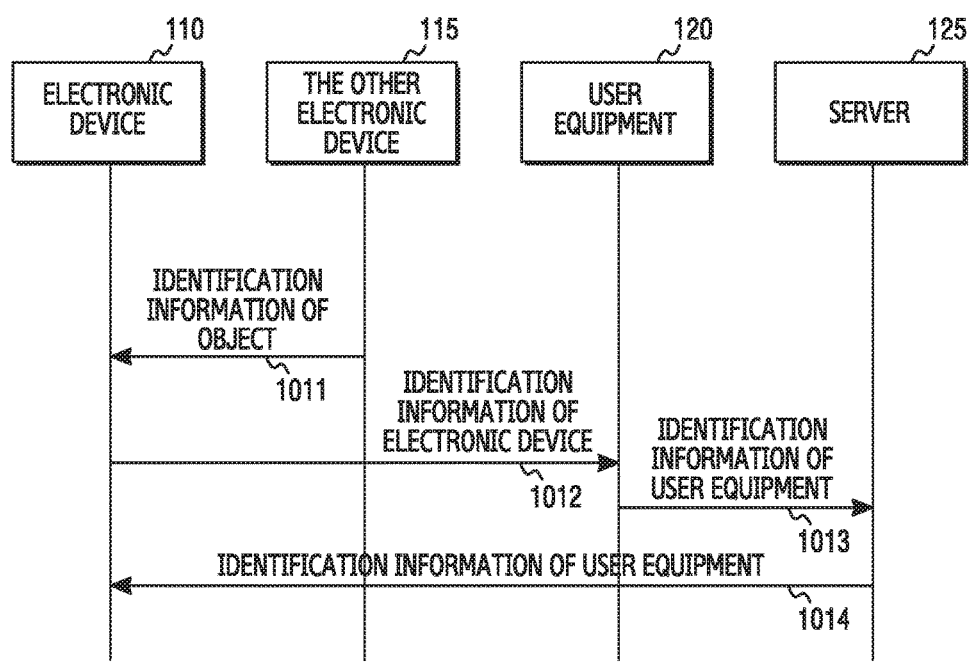
FIG. 10B illustrates a signal flow of a process in which the electronic device recognizes the adjacent object and user according to various embodiments of the present disclosure.

FIG. 10B illustrates a signal flow of a process in which the electronic device recognizes the adjacent object and user according to various embodiments of the present disclosure. The signal flow may be generated in the electronic device 110, the other electronic device 115, the UE 120, and the server 125, which are shown in FIG. 1.

Referring to FIG. 10B, in operation 1011, the other electronic device 115 may broadcast the identification information of the object. Due to the approach of the other electronic device 115 (or the object), the electronic device 110 may receive the identification information of the object.

In operation 1012, the electronic device 110 may broadcast the identification information of the electronic device 110 in response to the reception of the identification information of the object. Due to the approach of the UE 120 (or the user), the UE 120 may receive the identification information of the electronic device 110.

In operation 1013, in response to the reception of the identification information of the electronic device 110, the UE 120 may transmit the identification information of the UE 120 to the server 125. The server 125 may receive the identification information of the UE 120.

In operation 1014, the server 125 may transmit the identification information of the UE 120 to the electronic device 110. The electronic device 110 may receive the identification information of the UE 120. Due to the reception of the identification information of the UE 120, the electronic device 110 may recognize that the UE 120 (or the user) is positioned close to the electronic device 110.

In the case where the UE 120 directly transmits the identification information of the UE 120 to the electronic device 110, operation 1013 and operation 1014 may be omitted.

The electronic device 110, according to various embodiments, may determine whether or not the object and the user are positioned close to the electronic device 110 or whether or not the object and user approach the electronic device 110 through short-range communication or WAN communication. The electronic device 110 may recognize whether or not the user and the object are positioned close in order to thereby recognize the user's emotion for the object. The electronic device 110 may flexibly produce a sales strategy for the object based on the recognized user's emotion. The electronic device 110 may adaptively sell the object according to the user's emotion.

Figure 11A:
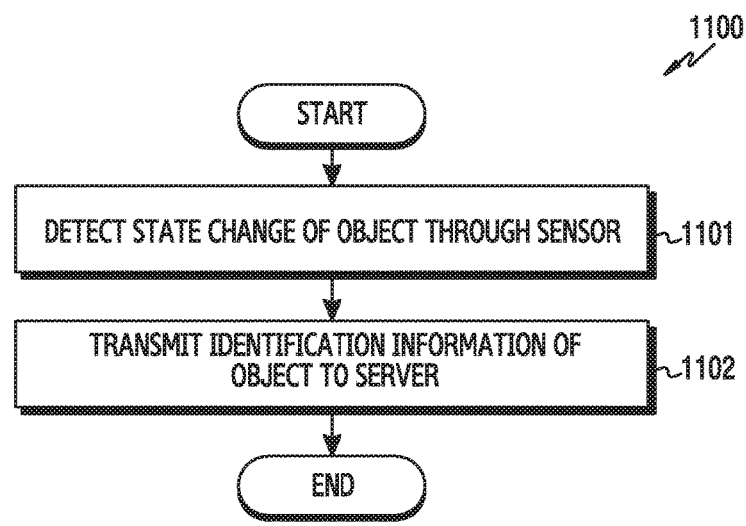
FIG. 11A is a flowchart illustrating an operation of the other electronic device for detecting a change in the state of the object according to various embodiments of the present disclosure.

FIG. 11A is a flowchart illustrating an operation of the other electronic device for detecting a change in the state of the object according to various embodiments of the present disclosure. The operation may be performed by the other electronic device 115 shown in FIG. 1.

Referring to FIG. 11A, the operational flow 1100 may include operation 1101 and/or operation 1102.

In operation 1101, the other electronic device 115 may detect a change in the state of the object corresponding to the other electronic device 115 through the sensor 505. For example, if the user touches the object, wears the object, or moves while carrying the object, the other electronic device 115 may detect the change in the state of the object through the sensor 505.

In operation 1102, the other electronic device 115 may transmit, to the server 125, the identification information of the object of which the state change has been detected. The server 125 may receive the identification information of the object from the other electronic device 115. The other electronic device 115 may transmit the identification information of the object to the electronic device 110 through the server 125 in order to inform that the state of the object has been changed. In some embodiments, unlike the description of operation 1102, the other electronic device 115 may directly transmit the identification information of the object to the electronic device 110.

Figure 11B:
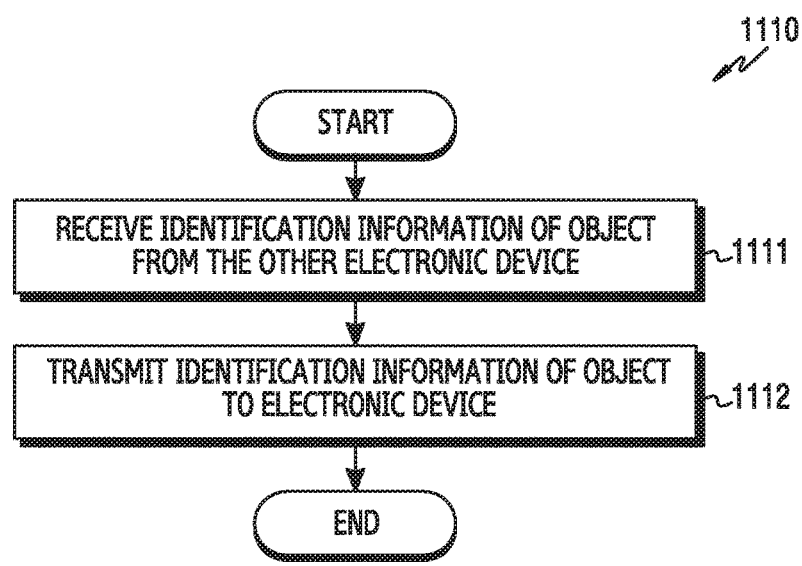
FIG. 11B is a flowchart illustrating an operation of the server to transmit identification information of the object according to various embodiments of the present disclosure.

FIG. 11B is a flowchart illustrating an operation of the server to transmit the identification information of the object according to various embodiments of the present disclosure. The operation may be performed by the server 125 shown in FIG. 1.

Referring to FIG. 11B, the operational flow 1110 may include operation 1111 and/or operation 1112.

In operation 1111, the server 125 may receive the identification information of the object from the other electronic device 115. The server 125 may receive the identification information of the object from the other electronic device 115 corresponding to the object of which the state change has been detected.

In operation 1112, the server 125 may transmit the identification information of the object to electronic device 110. The electronic device 110 may receive the identification information of the object. The electronic device 110 may filter a candidate group of objects that can approach the electronic device 110 through the reception of the identification information of the object. The electronic device 110 may easily determine the approach of the object through the filtering. In other words, the electronic device 110 may determine the approach of the object without the burden of complexity.

Figure 11C:
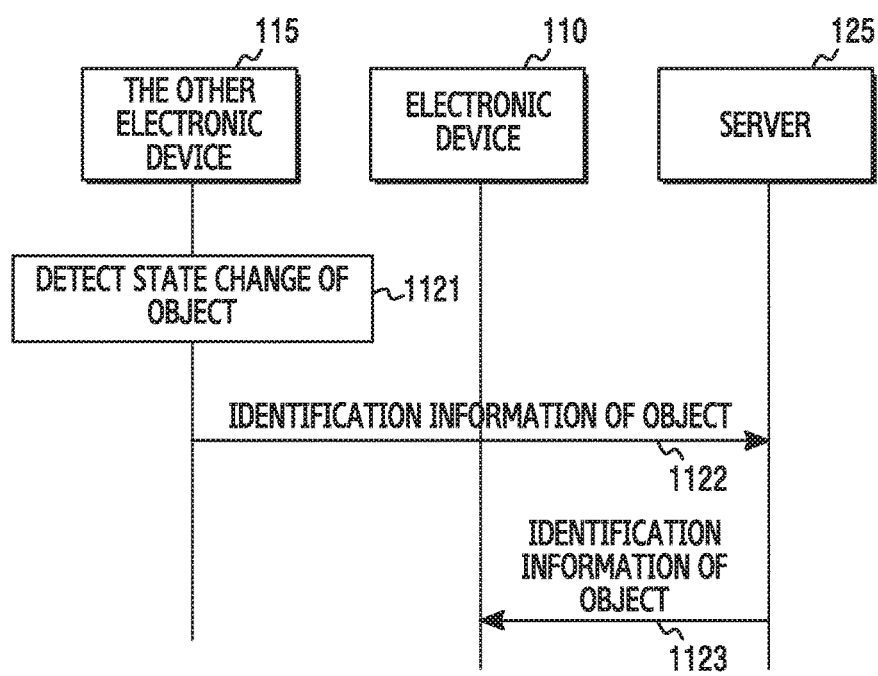
FIG. 11C illustrates a signal flow for detecting a change in the state of the object according to various embodiments of the present disclosure.

FIG. 11C illustrates a signal flow for detecting a change in the state of the object according to various embodiments of the present disclosure. The signal flow may be generated by the electronic device 110, the other electronic device 115, and the server 125, which are shown in FIG. 1.

Referring to FIG. 11C, in operation 1121, the other electronic device 115 may detect a change in the state of the object through the sensor 505. For example, the other electronic device 115 may detect a change in the state of the object through at least one of: a proximity sensor; a gyro sensor; a motion detection sensor; or an optical sensor.

In operation 1122, the other electronic device 115 may transmit the identification information of the object to the server 125. The server 125 may receive the identification information of the object from the other electronic device 115. The other electronic device 115 and the server 125 may perform the information exchange above through wired communication or wireless communication.

In operation 1123, the server 125 may transmit the identification information of the object to electronic device 110.

The electronic device 110 may receive the identification information of the object from the server 125.

The electronic device 110, according to various embodiments, may detect a change in the state of the object in order to thereby recognize the object in which the user is currently interested. The electronic device 110 may analyze the user's reaction with respect to the object of which the state change has been detected. The electronic device 110 may display a variety of messages in order to induce the user to purchase the object of which the state change has been detected.

Figure 12:
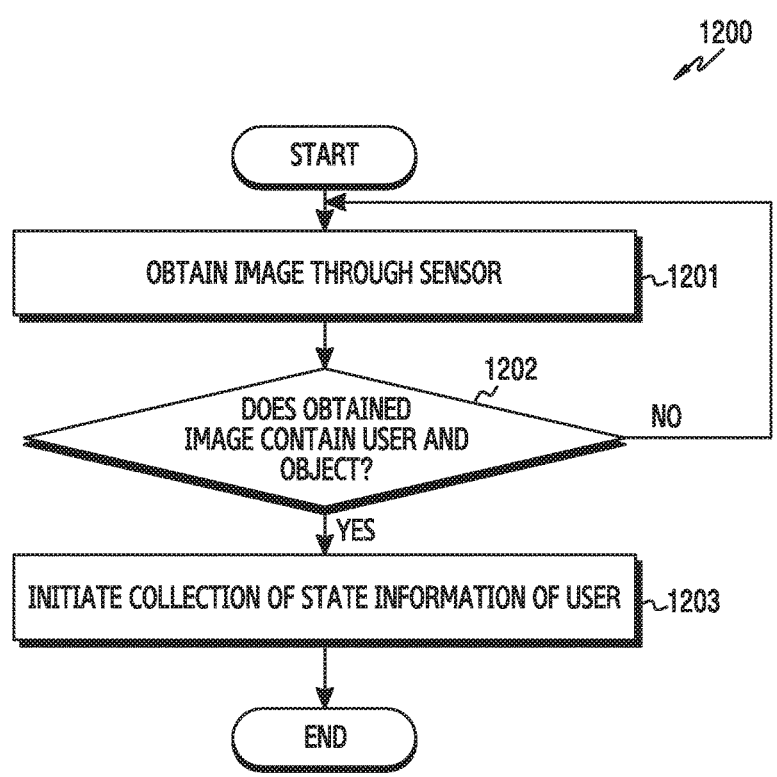
FIG. 12 is a flowchart illustrating another operation of the electronic device to determine the proximity of the user and the object according to various embodiments of the present disclosure.

FIG. 12 is a flowchart illustrating another operation of the electronic device to determine the proximity of the user and the object according to various embodiments of the present disclosure. The operation above may be performed by the electronic device 110 shown in FIG. 1.

Referring to FIG. 12, the operational flow 1200 may include operation 1201, operation 1202, and/or operation 1203.

In operation 1201, the electronic device 110 may obtain an image of the subject through the sensor 210. For example, the sensor 210 may include an image sensor or a camera. The electronic device 110 may obtain the image of the subject according to a designated cycle in order to identify the approach of the user and the object. In some embodiments, the electronic device 110 may obtain the image of the subject in real time in order to identify the approach of the user and the object. In some embodiments, if a change in the state of the object is detected, the electronic device 110 may obtain the image of the subject in real time in order to identify the approach of the user and the object.

In operation 1202, the electronic device 110 may determine whether or not the obtained image contains the user and the object. For example, if the obtained image contains only the object, the electronic device 110 may perform operation 1201 again. On the contrary, if the obtained image contains both the user and the object, the electronic device 110 may perform operation 1203.

In operation 1203, the electronic device 110 may initiate the collection of the state information of the user. The electronic device 110 may initiate the collection of the state information of the user when the user and the object are positioned close to the electronic device 110 for the reduction of power consumption, the reduction of complexity, and the improvement of a processing rate.

Figure 13A:
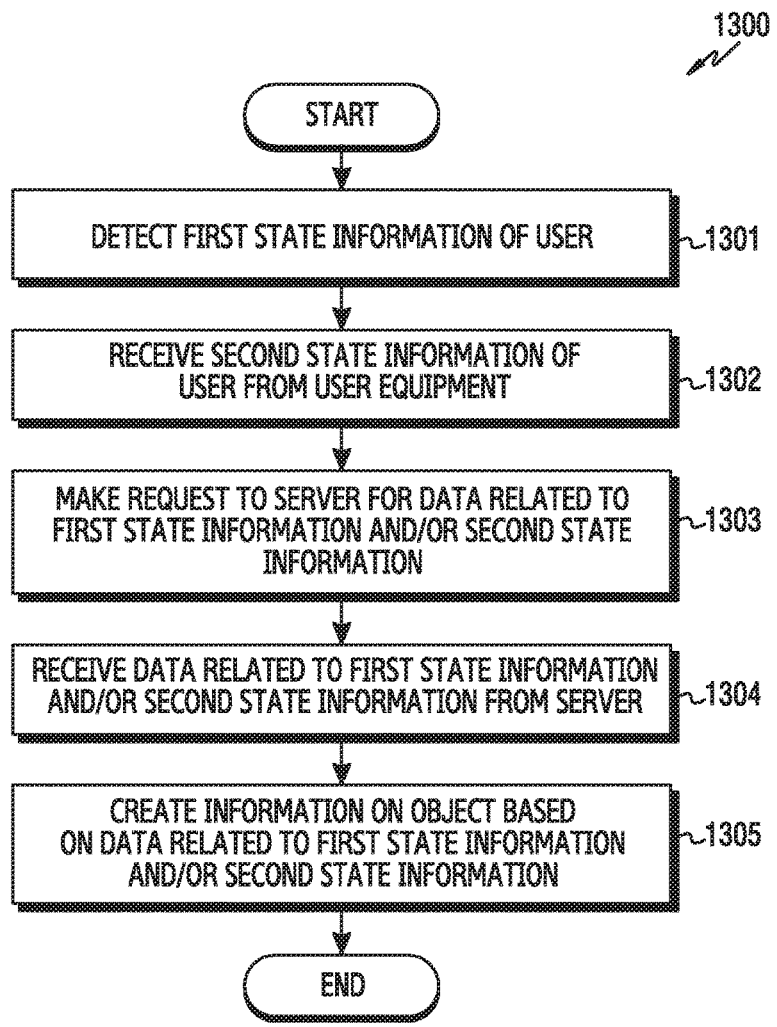
FIG. 13A is a flowchart illustrating an operation of the electronic device to create information on the object according to various embodiments of the present disclosure.

FIG. 13A is a flowchart illustrating an operation of the electronic device to create the information on the object according to various embodiments of the present disclosure. The operation above may be performed by the electronic device 110 shown in FIG. 1.

Referring to FIG. 13A, the operational flow 1300 may include operation 1301, operation 1302, operation 1303, operation 1304, and/or operation 1305.

In operation 1301, the electronic device 110 may detect the first state information of the user. The first state information may be obtained through the sensor 210 that is included in the electronic device 110. For example, the electronic device 110 may detect a user's facial area, as the first state information of the user, from an image that is obtained through the sensor 210. As another example, the electronic device 110 may detect user's voice data, as the first state information of the user, from voice data that is obtained through the sensor 210. As another example, the electronic device 110 may detect a portion on which the user's gaze focuses, as the first state information of the user, through the analysis of an image that is obtained through the sensor 210.

In operation 1302, the electronic device 110 may receive the second state information of the user from the UE 120. The second state information of the user may be detected by the sensor 405 that is included in the UE 120. For example, the UE 120 may transmit, to the electronic device 110, the user's heart rate, as the second state information of the user, which is detected through the sensor 405. The electronic device 110 may receive the user's heart rate as the second state information of the user. The electronic device 110 may utilize the second state information of the user as secondary data for creating the information on the object.

One of the operation 1301 or the operation 1302 may be omitted in some embodiments. In other words, the electronic device 110 may create the information on the object by using at least one piece of the first state information of the user or the second state information of the user.

In operation 1303, the electronic device 110 may make a request to the server 125 for data that is related to the first state information and/or the second state information. The data may be materials, data, functions, or commands necessary for creating the information on the object. The electronic device 110 may make a request to the server 125 for data in order to accurately analyze the user's emotion or reaction with respect to the object.

In operation 1304, the electronic device 110 may receive, from the server 125, the data that is related to the first state information and/or the second state information. The data may be the data that is requested by the electronic device 110 in operation 1303. In some embodiments, the server 125 may add data that is helpful for the information on the object to the data that is requested by the electronic device 110, and may transmit the same to the electronic device 110.

In operation 1305, the electronic device 110 may create the information on the object based on the data related to the first state information and/or the second state information.

For example, the electronic device 110 may create the information on the object based on the user's facial area, which is detected or extracted. The electronic device 110 may extract eyes, a nose, a mouth, and protruding positions thereof from the detected facial area of the user. In addition, the electronic device 110 may identify wrinkles of the skin and concave/convex portions of the surface thereof in the facial area of the user. The electronic device 110 may create the information on the object based on the identified or extracted portions.

As another example, the electronic device 110 may convert the shape of the user, which is detected or extracted, into a skeleton. The electronic device 110 may analyze the spatial distribution of joints of the converted skeleton based on root joints of the converted skeleton. The electronic device 110 may create the information on the object based on the directions, positions, motions of the analyzed joints.

As another example, the electronic device 110 may analyze the user's voice data that is detected or extracted. If the detected or extracted voice data contains a negative expression, the electronic device 110 may extract the negative expression. In addition, the electronic device 110 may extract beginning and latter words of the negative expression. The electronic device 110 may analyze the relationship between the extracted negative expression and the extracted beginning and latter words in order to thereby create the information on the object.

The electronic device 110 may analyze the state information of the user in order to thereby create the information on the object. The information on the object may contain the user's emotion or reaction with respect to the object. The electronic device 110 may provide a high quality service to the user through the created information on the object. The electronic device 110 may provide effective and proper feedback to the manufacturer or developer through the created information on the object.

Figure 13B:
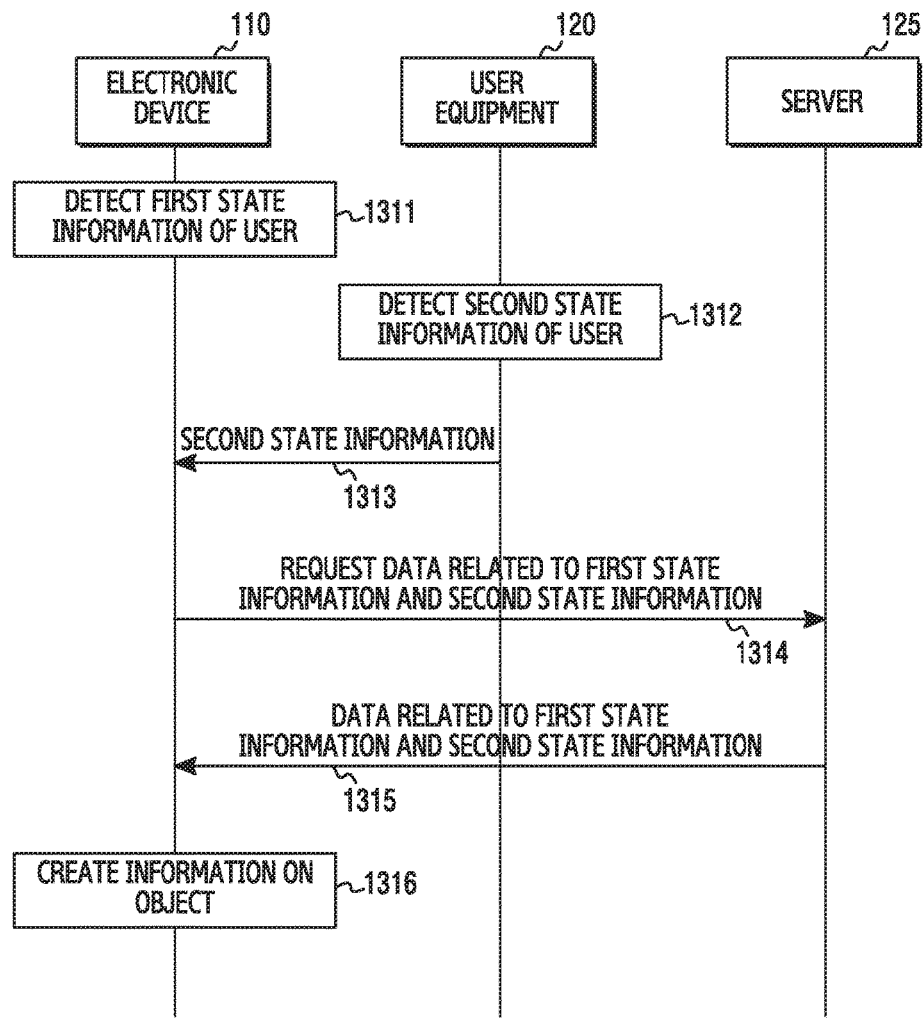
FIG. 13B illustrates a signal flow for creating information on the object according to various embodiments of the present disclosure.

FIG. 13B illustrates a signal flow for creating the information on the object according to various embodiments of the present disclosure. The signal flow may be generated by the electronic device 110, the UE 120, and the server 125, which are shown in FIG. 1.

Referring to FIG. 13B, in operation 1311, the electronic device 110 may detect first state information of the user through the sensor 210. In operation 1312, the UE 120 may detect the second state information of the user through the sensor 405. Operations 1311 and 1312 may be performed at the same time, or may be performed in reverse order.

In operation 1313, the UE 120 may transmit the second state information to the electronic device 110. The electronic device 110 may receive the second state information from the UE 120. The electronic device 110 may manage the first state information, which has been obtained in operation 1311, and the second state information by combining the same.

In operation 1314, the electronic device 110 may make a request to the server 125 for data that is related to the first state information and the second state information. In some embodiments, the electronic device 110 may make a request to the server 125 for data that is related to the first state information and/or the second state information.

In operation 1315, the server 125 may provide the electronic device 110 with the data that is related to the first state information and the second state information. In some embodiments, the server 125 may provide the electronic device 110 with the data that is related to the first state information and/or the second state information.

In operation 1316, the electronic device 110 may create the information on the object based on the data related to the first state information and the second state information. The information on the object may contain information about the user's reaction or emotion with respect to the object. The electronic device 110 may provide a variety of services to the manufacturer or the user based on the information on the object.

Figure 13C:
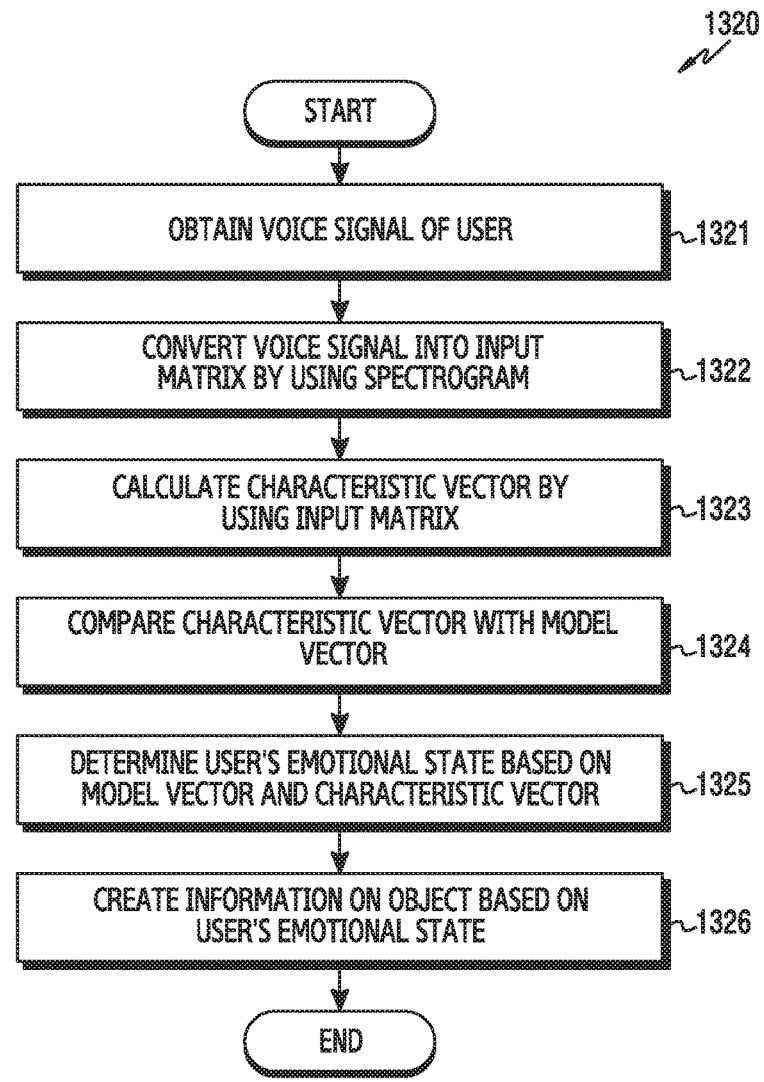
FIG. 13C is a flowchart illustrating an operation of the electronic device to create information on the object based on state information of the user according to various embodiments of the present disclosure.

FIG. 13C is a flowchart illustrating an operation of the electronic device that creates the information on the object based on the state information of the user according to various embodiments of the present disclosure. The operation above may be performed by the electronic device 110 shown in FIG. 1.

Referring to FIG. 13C, the operational flow 1320 may include operation 1321, operation 1322, operation 1323, operation 1324, operation 1325, and/or operation 1326.

In operation 1321, the electronic device 110 may obtain a voice signal from the user through the sensor 210 (e.g., a microphone) that is included in the electronic device 110.

In operation 1322, the electronic device 110 may convert the voice signal into an input matrix by using a spectrogram.

The electronic device 110 may designate a change in the voice signal depending on a time axis and a frequency axis to be respective elements of the input matrix by using a spectrogram. Since the respective elements of the input matrix are amplitude values of the voice signal according to frequency and time, they may be non-negative numbers. The input matrix may separate rows according to a frequency unit of the frequency axis, and may separate columns according to a time unit of the time axis. For example, in the case where the electronic device 110 separates the frequency axis into 512 frequencies (f1 to f512) and separates the time axis into 200 time points (t1 to t200), the input matrix may be converted into a matrix of 512×200. For example, the amplitude value corresponding to the frequency f3 and the time t2 may be the element V (3, 2) of the third row and second column of the input matrix.

In operation 1323, the electronic device 110 may perform non-negative matrix factorization with respect to the input matrix in order to thereby calculate a characteristic vector. The non-negative matrix factorization (NMF) may have useful properties to factorize multivariate data. The electronic device 110 may factorize the input matrix to two matrixes by applying the update rule. The two matrixes may be a basis matrix and an encoding matrix.

The basis matrix may contain specific information of the input matrix, and the encoding matrix may contain encoding information.

The Euclidean distance between the matrixes that are calculated by multiplying the input matrix by the basis matrix and the encoding matrix in the update rule may have a feature of not increasing. The electronic device 110 may perform a continuous update by using the update rule, and may calculate an error by using the update result and the cost function.

The basis matrix may have basic information on the input matrix. Therefore, if the property of the input matrix is different, the property of the basis matrix may be different according thereto. Since the input matrix uses the spectrogram, the basis matrix may have information related to the frequency of the voice signal, and the encoding matrix may have encoding information according to time of the voice signal. Thus, the basis matrix may be a characteristic vector to indicate the frequency characteristic of the input matrix.

It is assumed that the input matrix is a matrix of n×m. In this case, the input matrix may be determined to have m data vectors of n dimensions. For example, in the case of the example of the input matrix, it may be determined that there are two hundred data vectors of 512 dimensions based on frequency with time.

According to the matrix operation, the basis matrix may have n×r dimensions, and the encoding matrix may have r×m dimensions. Since the characteristics of the input matrix exist not in m but in n, the basis matrix may represent the characteristics of the input matrix. r is a random natural number, and may be configured by the user. Hereinafter, although it is assumed that r is 1 for the convenience of explanation, the present disclosure is not limited thereto.

By using the method described above, the electronic device 110 may calculate the basis vector that has the characteristics of the input matrix, and may determine the same to be a characteristic vector.

In operation 1324, the electronic device 110 may compare the characteristic vector with a model vector that is contained in an emotion model database that is stored in the server 125 or the electronic device 110. The model vector may be a result of the non-negative matrix factorization with respect to a model voice signal, and may be pre-stored in the emotion model database.

The comparison of the characteristic vector and the model vector may be performed by a method of using the square of the Euclidean distance. The Euclidean distance may be used to calculate the difference between the stored model vector and a new characteristic vector in order to thereby select the most similar model vector. The electronic device 110 may make the difference of characteristic portions greater, and may make the difference of non-characteristic portions smaller by using the square of the Euclidean distance. It is due to the fact that a value that is obtained through the square of a small difference value results in a small difference value and that a value that is obtained through the square of a large difference value results in a large difference value.

Although the method of using the Euclidean distance is illustrated to find the similarity between the characteristic vector and the model vector in the present disclosure, this is only an example, and it should be understood that various methods for finding the similarity between vectors may be applied to the present disclosure.

In operation 1325, the electronic device 110 may determine the user's emotional state implied in the voice signal based on the model vector and the characteristic vector. The electronic device 110 may compare the model vector and the characteristic vector in order to thereby select the most similar model vector. The electronic device 110 may determine an emotional model indicated by the selected model vector to be the emotional state implied in the voice signal.

In operation 1326, the electronic device 110 may create the information on the object based on the determined emotional state. For example, if the determined emotional state is happiness, the electronic device 110 may create information stating that the user likes the object as the information on the object.

Figure 13D:
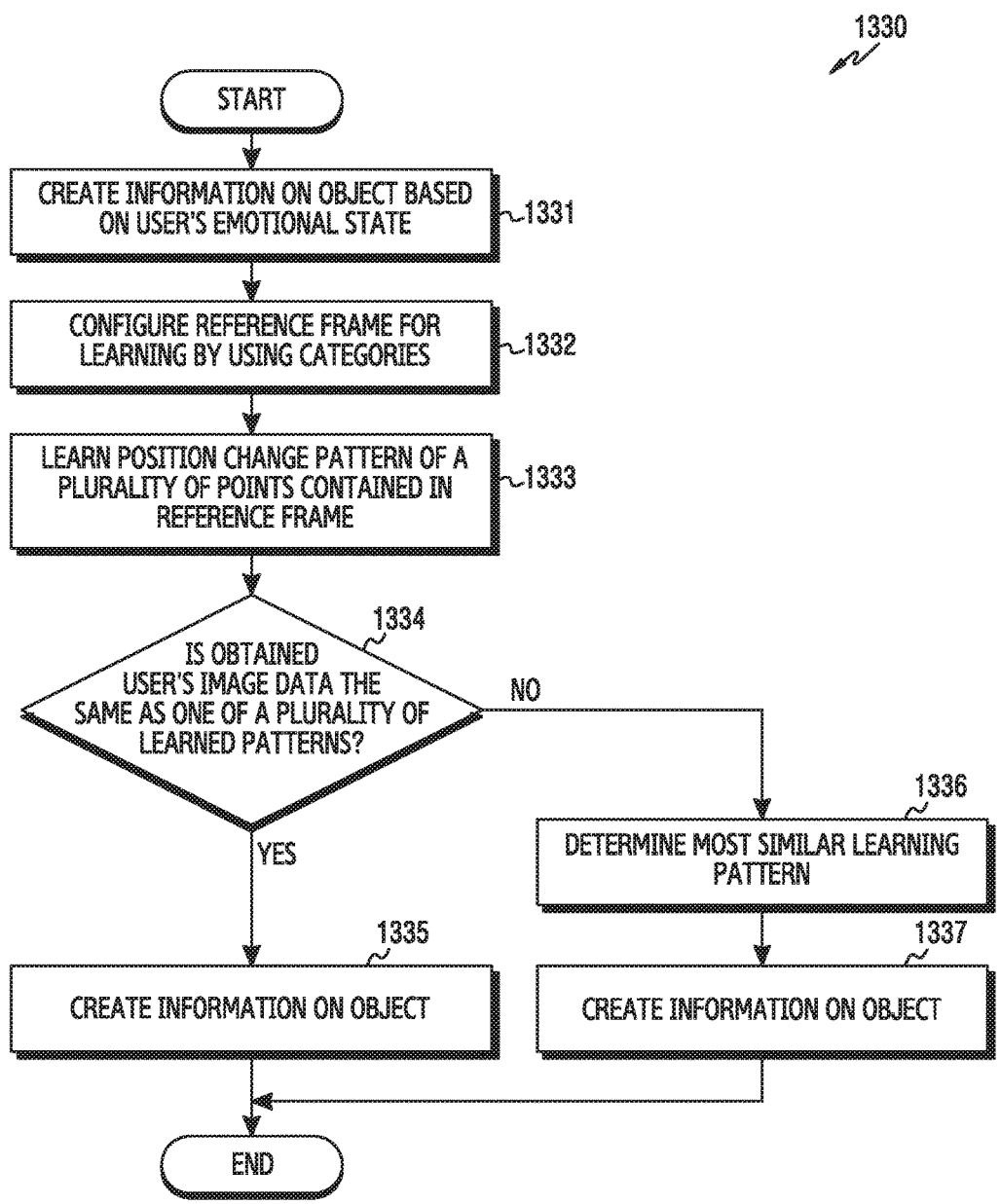
FIG. 13D is a flowchart illustrating another operation of the electronic device to create information on the object based on state information of the user according to various embodiments of the present disclosure.

FIG. 13D is a flowchart illustrating another operation of the electronic device that creates the information on the object based on the state information of the user according to various embodiments of the present disclosure. The operation above may be performed by the electronic device 110 shown in FIG. 1.

Referring to FIG. 13D, the operational flow 1330 may include operation 1331, operation 1332, operation 1333, operation 1334, operation 1335, operation 1336, and/or operation 1337.

In operation 1331, the electronic device 110 may classify the user's emotions into a plurality of categories. Information on the plurality of categories may be stored in the memory of the electronic device 110 or in the server 125. For example, the plurality of categories classified above may be comprised of: joy for the object; surprise at the object; anger at the object; fear of the object; or dislike of the object. This is only an example, and a plurality of emotions may be classified according to other criteria.

In operation 1332, the electronic device 110 may configure a reference frame for learning by using the classified categories. The electronic device 110 may designate a frame of a peak point that best represents the emotion for each category as the reference frame. The configured reference frame may be stored in the memory of the electronic device 110 or in the server 125. The operation of designating the reference frame may be an operation to minimize the information to be analyzed by the electronic device 110. The electronic device 110 may configure the reference frame through the user who visits the store. In some embodiments, the electronic device 110 may configure the reference frame in advance. For example, the electronic device 110 may obtain: an image that contains a face of the user who cheers for the object A; an image that contains a face of the user who is disappointed with the object B; and an image that contains a face of the user who dislikes the object C. The electronic device 110 may configure the frame in which the user's emotion reaches a peak point among the obtained images to be the reference frame.

In operation 1333, the electronic device 110 may learn a position change pattern of a plurality of points that are included in the reference frame. For example, the electronic device 110 may automatically designate a plurality of points of the facial area contained in the configured reference frame. The plurality of points may be reference points for learning the position change pattern. The electronic device 110 may learn the position change pattern through a plurality of points contained in the reference frame. For example, the electronic device 110 may learn the position change pattern of a plurality of points corresponding to joy and the position change pattern of a plurality of points corresponding to disappointment.

In operation 1334, the electronic device 110 may determine whether or not a change pattern of user's image data, which has been obtained, is the same as at least one of a plurality of learned patterns. If the change pattern of the obtained user's image data matches one of a plurality of learned patterns, the electronic device 110 may perform operation 1335. On the contrary, if no change pattern of the obtained user's image data matches the plurality of learned patterns, the electronic device 110 may perform operation 1336.

In operation 1335, the electronic device 110 may create the information on the object according to the corresponding learned pattern. For example, if the change pattern of the user's image data is determined to be "joy," the electronic device 110 may create the information on the object, which states that the user prefers the object. As another example, if the change pattern of the user's image data is determined to be "dislike," the electronic device 110 may create the information on the object, which states that the user does not prefer the object.

In operation 1336, the electronic device 110 may determine a learning pattern that is most similar to the user's face change pattern contained in the obtained image data of the user. For example, the electronic device 110 may determine a learning pattern that is most similar to the user's face change pattern contained in the obtained image data of the user by using the Euclidean distance.

In operation 1337, the electronic device 110 may create the information on the object by using the determined learning pattern. For example, if the determined learning pattern is "preference," the electronic device 110 may create, as the information on the object, information stating that the user prefers the object. As another example, if the determined learning pattern is "dislike," the electronic device 110 may create, as the information on the object, information stating that the user does not prefer the object.

Figure 13E:
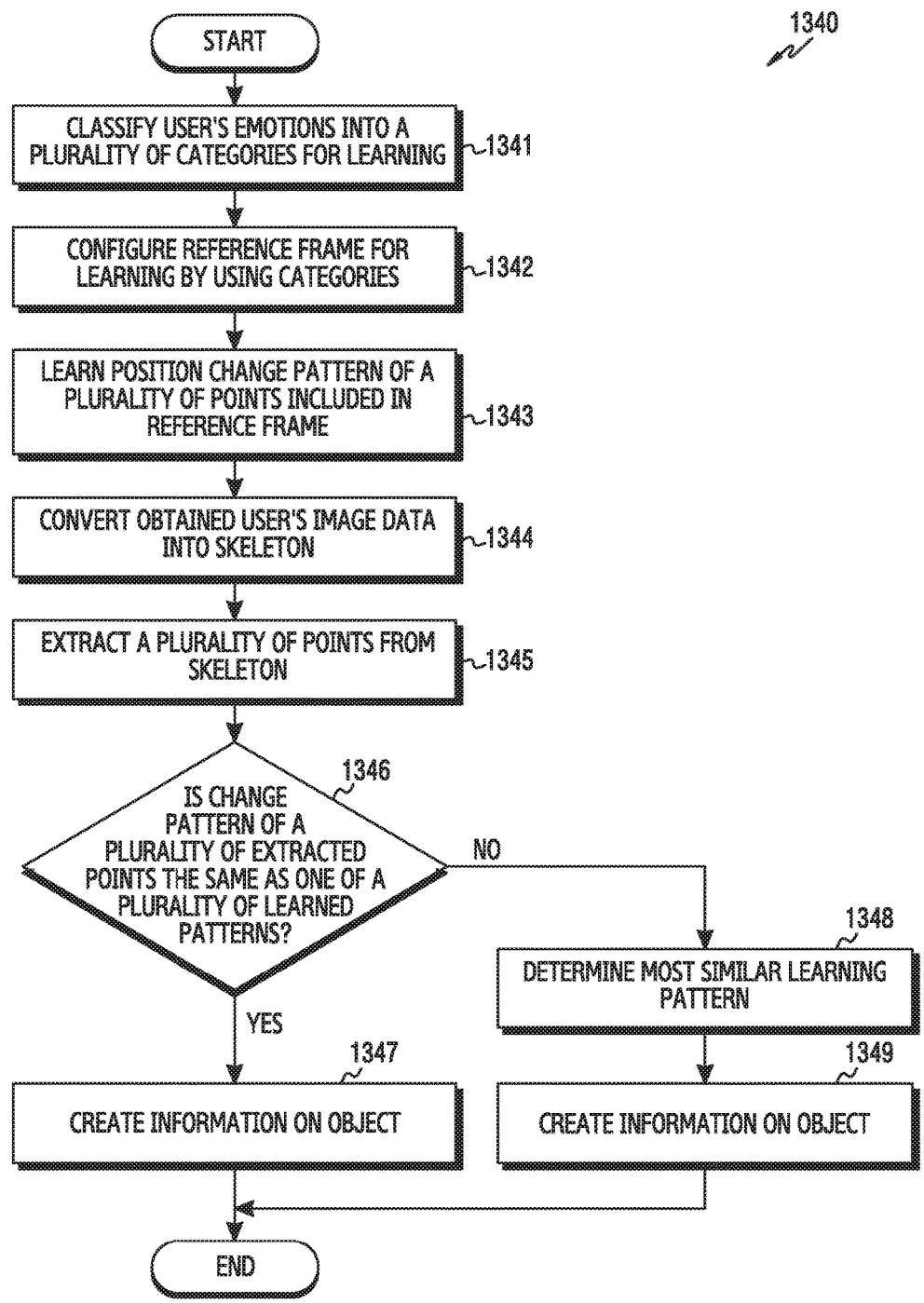
FIG. 13E is a flowchart illustrating another operation of the electronic device to create information on the object based on state information of the user according to various embodiments of the present disclosure.

FIG. 13E is a flowchart illustrating another operation of the electronic device that creates the information on the object based on the state information of the user according to various embodiments of the present disclosure. The operation above may be performed by the electronic device 110 shown in FIG. 1.

Referring to FIG. 13E, the operational flow 1340 may include operation 1341, operation 1342, operation 1343, operation 1344, operation 1345, operation 1346, operation 1347, operation 1348, and/or operation 1349.

In operation 1341, the electronic device 110 may classify the user's emotions into a plurality of categories for learning. Information on the plurality of categories may be stored in the memory of the electronic device 110 or in the server 125. For example, the plurality of categories classified may be comprised of joy for the object, surprise at the object, anger at the object, fear of the object, or dislike of the object. This is only an example, and a plurality of emotions may be classified according to other criteria.

In operation 1342, the electronic device 110 may configure a reference frame for learning by using the classified categories. The electronic device 110 may designate a frame of a peak point that best represents the emotion for each category as the reference frame. The configured reference frame may be stored in the memory of the electronic device 110 or in the server 125. The operation of designating the reference frame may be an operation to minimize the information to be analyzed by the electronic device 110. The electronic device 110 may configure the reference frame through the user who visits the store. In some embodiments, the electronic device 110 may configure the reference frame in advance. For example, the electronic device 110 may obtain: an image about the gesture of the user who keeps an eye on a specific portion of the object A (e.g., the gesture of the user who keeps an eye on the sleeve of the object A); and an image about the gesture of the user who feels uncomfortable for wearing the object B (e.g., the user's gesture in the case where the object B is clothing that is too small for the user). The electronic device 110 may configure the frame that represents the user's gesture among the obtained images to be the reference frame.

In operation 1343, the electronic device 110 may learn a position change pattern of a plurality of points that are included in the reference frame. For example, the electronic device 110 may convert the body area of the user contained in the configured reference frame into a skeleton. The electronic device 110 may automatically designate a plurality of points of the converted skeleton. The plurality of points may be reference points for learning the position change pattern. For example, the electronic device 110 may learn the position change pattern through a plurality of points contained in the reference frame. For example, the electronic device 110 may learn: the position change pattern of a plurality of points corresponding to the gesture of the user who is not satisfied with a specific portion of the object; and the position change pattern of a plurality of points corresponding to the gesture of the user who is not satisfied with the size and design of the object.

In operation 1344, the electronic device 110 may convert the obtained image data of the user into a skeleton. The operation of converting the image data into the skeleton may be an operation to extract vectors for the user's gestures from the obtained image data of the user.

In operation 1345, the electronic device 110 may extract a plurality of points from the converted skeleton. The plurality of points may be reference points to trace a position change. The electronic device 110 may extract a plurality of points based on joints of the converted skeleton.

In operation 1346, the electronic device 110 may determine whether or not the change pattern of a plurality of extracted points is the same as one of a plurality of learned patterns. If the change pattern of a plurality of points extracted from the skeleton matches one of a plurality of learned patterns, the electronic device 110 may perform operation 1347. On the contrary, if no change pattern of a plurality of points extracted from the skeleton matches the plurality of learned patterns, the electronic device 110 may perform operation 1348.

In operation 1347, the electronic device 110 may create the information on the object according to the corresponding learned pattern. For example, if the change pattern of a plurality of points extracted from the skeleton is determined to be the user's gesture representing that the size is small, the electronic device 110 may create, as the information on the object, information stating that the user is dissatisfied with the size.

In operation 1348, the electronic device 110 may determine a learning pattern that is most similar to the change pattern of a plurality of points extracted from the skeleton. For example, the electronic device 110 may determine a learning pattern that is most similar to the change pattern of a plurality of points extracted from the skeleton by using the update rule and the Euclidean distance.

In operation 1349, the electronic device 110 may create the information on the object by using the determined learning pattern. For example, if the determined learning pattern corresponds to the user's gesture representing that the user is dissatisfied with the sleeve of the object (e.g., clothing), the electronic device 110 may create, as the information on the object, information stating that the user is dissatisfied with the sleeve of the object.

Figure 13F:
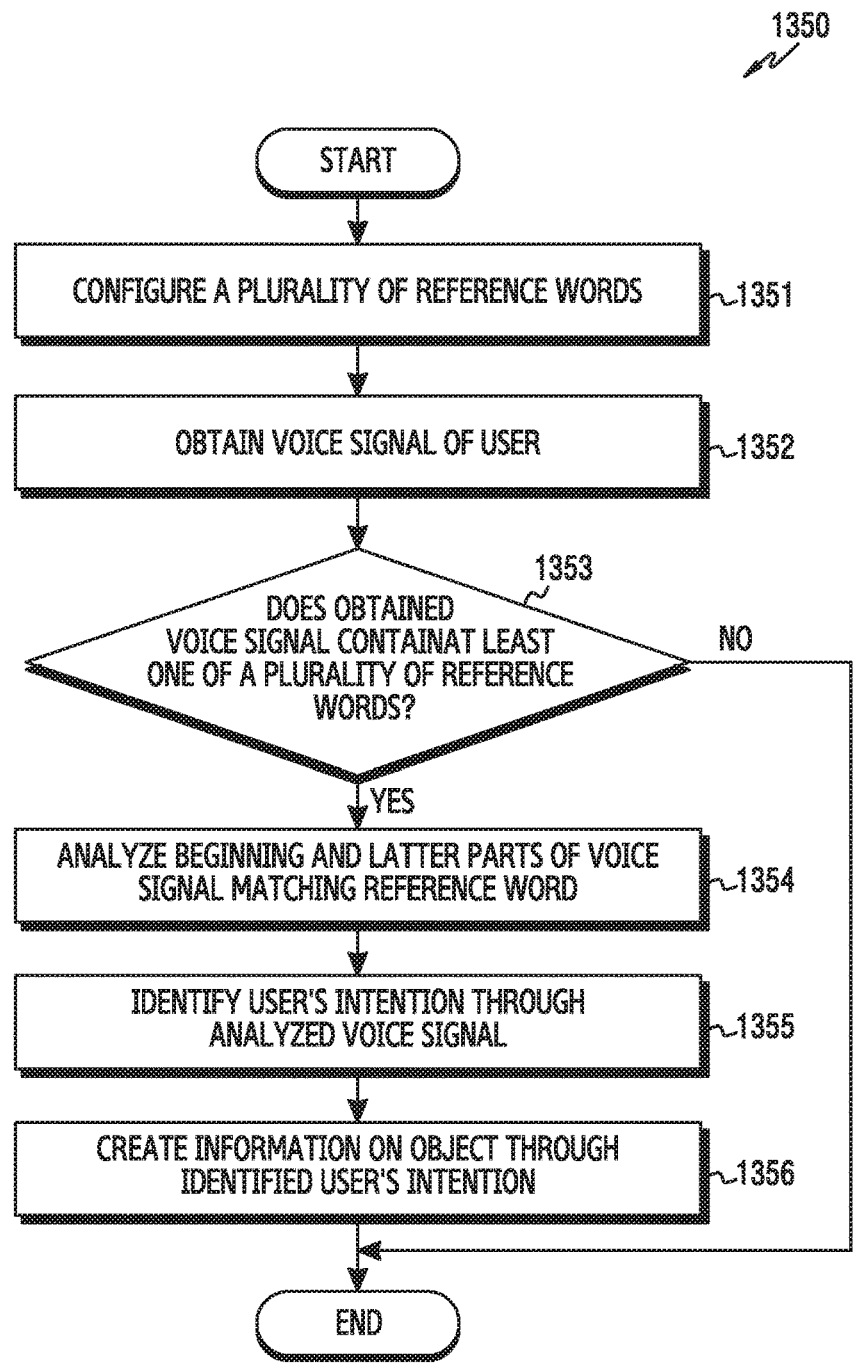
FIG. 13F is a flowchart illustrating another operation of the electronic device to create information on the object based on state information of the user according to various embodiments of the present disclosure.

FIG. 13F is a flowchart illustrating another operation of the electronic device that creates the information on the object based on the state information of the user according to various embodiments of the present disclosure. The operation above may be performed by the electronic device 110 shown in FIG. 1.

Referring to FIG. 13F, the operational flow 1350 may include operation 1351, operation 1352, operation 1353, operation 1354, operation 1355, and/or operation 1356.

In operation 1351, the electronic device 110 may configure a plurality of reference words. The plurality of reference words may be used as reference points to filter the portion to be analyzed from the voice signal of the user. For example, if the object is clothing, the reference words may be configured to be a waist, length, or the like. As another example, if the object is a high price, the reference word may be configured to be price. As another example, if the object is a smart phone, the reference words may be a color, a function, or the like.

In operation 1352, the electronic device 110 may obtain a voice signal of the user. The electronic device 110 may obtain the voice signal of the user through the sensor 210.

In operation 1353, the electronic device 110 may determine whether or not the obtained voice signal of the user contains at least one of a plurality of reference words. If the obtained voice signal of the user contains at least one of a plurality of reference words, the electronic device 110 may perform operation 1354. For example, if the obtained voice signal of the user says "I have tried on this dress. I like the design, but I think the waist is uncomfortable. What do you think of that?" and if a plurality of the reference words contain a "waist," the electronic device 110 may determine that the obtained voice signal of the user contains a reference word. If the obtained voice signal of the user does not contain all of a plurality of reference words, the electronic device 110 may terminate the analysis of the voice signal.

In operation 1354, the electronic device 110 may analyze the beginning and latter parts of the word of the voice signal, which matches the reference word. In the case of the aforementioned example, the electronic device 110 may analyze the voice signal "I have tried on this dress. I like the design, but I think," and "is uncomfortable. What do you think of that?" corresponding to the beginning and latter parts of the word "waist."

In operation 1355, the electronic device 110 may identify the user's intention through the analyzed voice signal. In the case of the aforementioned example, the electronic device 110 may identify the user's intention in which the user is satisfied with the design of the dress but is dissatisfied with the waist size.

In operation 1356, the electronic device 110 may create the information on the object through the identified user's intention. In the case of the aforementioned example, the electronic device 110 may create, as the information on the object, information stating that the user is satisfied with the design of the dress but is dissatisfied with the waist size. In addition, the electronic device 110 may create, as the information on the object, information to recommend a dress of the next bigger size to the user or information to recommend clothes with a proper waist size and a similar design to the user.

Figure 13G:
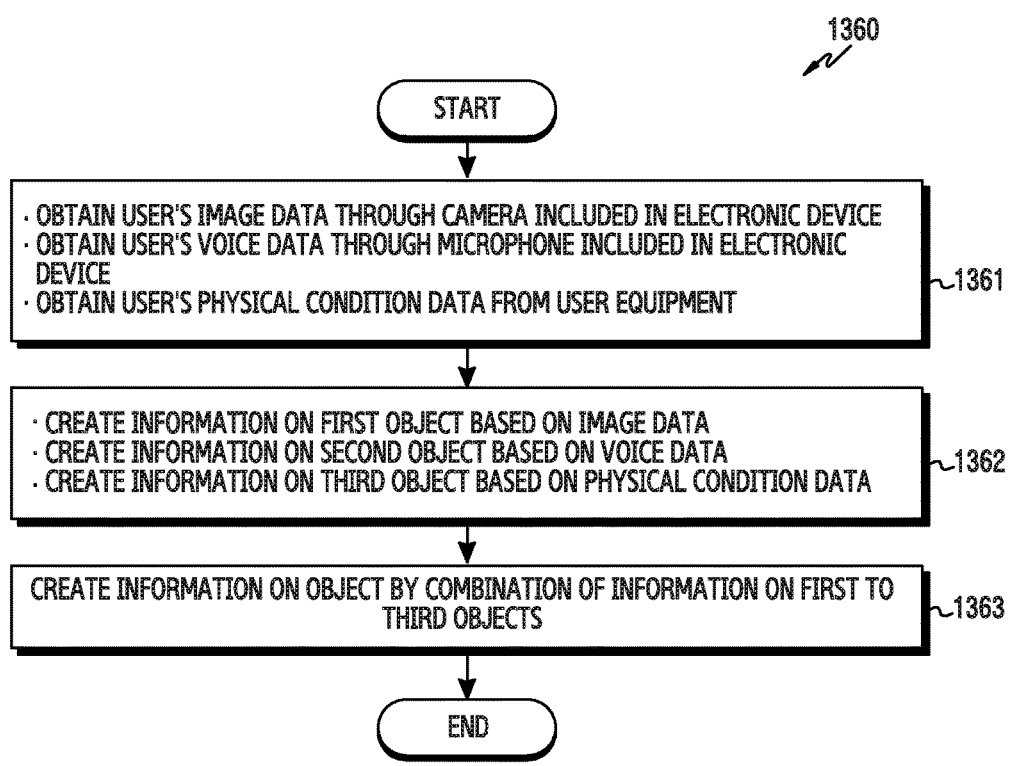
FIG. 13G is a flowchart illustrating an operation of the electronic device to create information on the object based on state information of a plurality of users according to various embodiments of the present disclosure.

FIG. 13G is a flowchart illustrating an operation of the electronic device that creates the information on the object based on the state information of a plurality of users according to various embodiments of the present disclosure. The operation above may be performed by the electronic device 110 shown in FIG. 1.

Referring to FIG. 13G, the operational flow 1360 may include operation 1361, operation 1362, and/or operation 1363.

In operation 1361, the electronic device 110 may obtain user's image data through the sensor 210 (e.g., a camera) that is included in the electronic device 110. The electronic device 110 may obtain user's voice data through the sensor 210 (e.g., a microphone) that is included in the electronic device 110. The electronic device 110 may obtain user's physical condition data from the UE 120. The user's physical condition data may be obtained from the sensor 405 that is included in the UE 120. For example, the user's physical condition data may contain information about the user's heart rate, the user's blood pressure, or the like.

In operation 1362, the electronic device 110 may create information on the first object based on the image data. The image data may contain user's face information and/or user's gesture information. For example, the electronic device 110 may create the information on the first object by using at least one of a plurality of gestures that are described in FIGS. 13D and 13E.

The electronic device 110 may create information on the second object based on the voice data. For example, the electronic device 110 may create the information on the second object by using at least one of a plurality of gestures that are described in FIGS. 13C and 13F.

The electronic device 110 may create information on the third object based on the physical condition data.

In operation 1363, the electronic device 110 may create the information on the object by combining at least one piece of the information on the first object to the third object. Through the combination of the information on the first object to the third object, the electronic device 110 may more accurately create the information on the object.

Figure 14A:
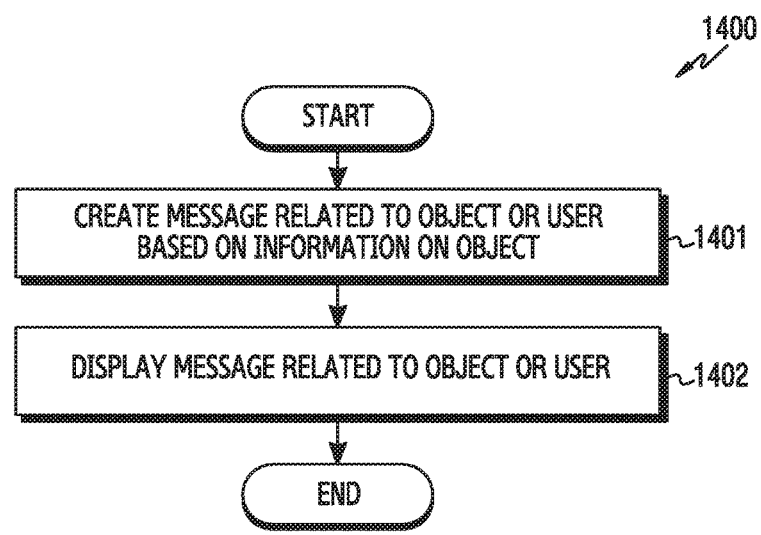
FIG. 14A is a flowchart illustrating an operation of the electronic device to display a message according to various embodiments of the present disclosure.

FIG. 14A is a flowchart illustrating an operation of the electronic device that displays a message according to various embodiments of the present disclosure. The operation above may be performed by the electronic device 110 shown in FIG. 1.

Referring to FIG. 14A, the operational flow 1400 may include operation 1401 and/or operation 1402.

In operation 1401, the electronic device 110 may create a message related to the object or the user based on the information on the object.

The information on the object may contain customer information. For example, the customer information may contain the age of the user (e.g., the user 130) corresponding to the UE 120, an object purchase history according to gender, or a non-purchase history. In addition, the information on the object may contain multi-customer information. The multi-customer information may be based on purchase data on a plurality of customers with respect to a specific object. The customer information and the multi-customer information may be stored in the memory of the electronic device 110 or in the server 125.

The message related to the object or the user may be a message to induce the purchase of the object. The message related to the object or the user may provide benefits that are applicable to the user or discount information for the object.

In some embodiments, the message related to the object the user may be created by the following method. The electronic device 110 may calculate the probability in which the customer purchases a specific object by using the multi-customer information and the customer information. The probability in which the customer purchases a specific object may be expressed as Equation 1 below.

$$p(\text{purchase}|\text{customer information, multi-customer information}) \quad \text{Equation 1}$$

Provided that the case where the customer purchases the specific object is independent from the case where a plurality of customers purchase the specific object, the Equation 1 may be expressed as Equation 2 below.

$$p(\text{purchase}|\text{customer information: multi-customer information}) = p(\text{purchase}|\text{customer information}) \times p(\text{purchase}|\text{multi-customer information}) \quad \text{Equation 2}$$

Provided that the specific object has a number of characteristics, p(purchase|multi-customer information) of Equation 2 may be expressed as Equation 3 below.

$$p(\text{purchase}|\text{multi-purchase information}) = \Sigma_{=product\ characteristic1}^{product\ characteristicN} p(\text{purchace, product characteristic } i|\text{emotion, gesture, word, age} \ldots) \quad \text{Equation 3}$$

In Equation 3, "product characteristic i" may indicate a number of characteristics that the specific object has. "emotion, gesture, word, age . . . " may be examples of information that is contained in the multi-customer information.

Equation 3 may be expressed as Equation 4 below.

$$p(\text{purchase, product characteristic}i|\text{emotion, gesture, word, age} \ldots) = p(\text{purchase}|\text{emotion, gesture, word, age} \ldots) \times p(\text{product characteristic}i|\text{emotion, gesture, word, age} \ldots) \quad \text{Equation 4}$$

When applying the Bayes Rule to Equation 4, Equation 4 may be expressed as Equation 5 below.

$$p(\text{purchase, product characteristic } i \mid \text{emotion, gesture, word, age} \ldots) = p(\text{purchase} \mid \text{emotion, gesture, word, age} \ldots) \times p(\text{product characteristic } i \mid \text{emotion, gesture, word, age} \ldots) = \left[\frac{p(\text{emotion, gesture, word, age} \ldots \mid \text{purchase})}{p(\text{emotion, gesutre, word, age} \ldots)} \times p(\text{purchase})\right] \times \left[\frac{p(\text{emotion, gesture, word, age} \ldots \mid \text{product characteristic } i)}{p(\text{emotion, gesture, word, age} \ldots)} \times p(\text{product characteristic } i)\right] = [p(\text{emotion, gesture, word, age} \ldots \mid \text{purchase}) \times p(\text{purchase})][p(\text{emotion, gesture, word, age} \ldots \mid \text{product characteristic } i) \times p(\text{purchase characteristic } i)] \quad \text{Equation 5}$$

By using Equation 5, p(purchase|multi-customer information) may be expressed as Equation 6 below.

$$p(\text{purchase} \mid \text{multi-purchase information}) = \qquad \text{Equation 6}$$

$$\sum_{i=\text{product characteristic }1}^{\text{product characteristic }n} p(\text{purchase, product characteristic }i \mid$$

$$\text{emotion, gesture, word, age } \ldots) \times$$

$$\sum_{i=\text{product characteristic }1}^{\text{product chracteristic }n} \left[ p(\text{emotion, gesture, word,} \right.$$

$$\left. \text{age } \ldots \mid \text{purchase}) \times p(\text{purchase}) \right|$$

$$\left[ p(\textit{emotion, gesture}, \text{word, age } \ldots \mid \right.$$

$$\text{product characteristic } i) \times p($$

$$\left. \text{purchase characteristic } i) \right] =$$

$$\left[ p(\text{emotion, gesture, word,} \right.$$

$$\left. \text{age } \ldots \mid \text{purchase}) \times p(\text{purchase}) \right|$$

$$\lrcorner \times \sum_{=\text{product characteristic }1}^{\text{product characterisitc }n} [$$

$$p(\text{emotion, gesture, word, age}$$

$$\ldots \mid \text{product characteristic } i) \times$$

$$p(\text{purchase characteristic } i)]$$

Provided that a plurality of pieces of information (e.g., emotion, gesture, word, age, etc.) contained in the multi-customer information are independent from each other, Equation 6 may be expressed as Equation 7 below.

$$p(\text{purchase} \mid \text{multi} - \text{customer information}) = [ \qquad \text{Equation 7}$$

$$p(\text{emotion, gesture, word, age } \ldots \mid \text{purchase}) \times$$

$$p(\text{purchase})] \times \sum_{i=\text{product characteristic }1}^{\text{product chracteristic }n} \left[ p(\text{emotion,} \right.$$

$$\text{gesture, word, age } \ldots \mid \text{product characteristic } i) \times$$

$$p\Big( \text{purchase chat} = [p(\text{emotion} \mid \text{purchase}) \times$$

$$p(\text{gesture} \mid \text{purchase}) \times p(\text{word} \mid \text{purchase}) \times$$

$$\ldots \times p(\text{purchase})] \times \sum_{i=\text{product characteristic }1}^{\text{product chracteristic }n} [$$

$$p(\text{emotion} \mid \text{product characteristic } i) \times p$$

$$(\text{gesture} \mid \text{product characteristic } i) \times p($$

$$\text{word} \mid \text{product characteristic } i) \times$$

$$\ldots \times p(\text{product characteristic } i)]$$

Since each element of Equation 7 {e.g., p(emotion|purchase), p(gesture|purchase), p(word|purchase), or the like} can be calculated through the information on the object, the electronic device 110 may calculate p(purchase|multi-customer information) through Equation 7.

The electronic device 110 may also calculate p(purchase|multi-customer information) by using the principles of Equations 3 to 7. In addition, the electronic device 110 may calculate the probability {that is, p(purchase|customer information, multi-customer information)} in which the customer purchases the specific object by using p(purchase|multi-customer information), p(purchase|customer information) and Equation 2 above.

The electronic device 110 may calculate the probability p(non-purchase|customer information, mufti-customer information; in which the customer does not purchase the specific object by using the principles of Equations 3 to 7.

The electronic device 110 may determine the customer's intention to purchase the specific object by comparing p(purchase|customer information, multi-customer information) and p(non-purchase|customer information, multi-customer information). For example, if p(purchase|customer information, multi-customer information) is greater than p(non-purchase|customer information, multi-customer information), the electronic device 110 may determine that the customer highly intends to purchase the specific object. As another example, if p(purchase|customer information, multi-customer information) is less than p(non-purchase|customer information, multi-customer information), the electronic device 110 may determine that the customer has little intention of purchasing the specific object.

The electronic device 110 may estimate the cause for the purchase or non-purchase. For example, if the customer has little intention of purchasing the specific object, the electronic device 110 may search for the factor of highest probability among p(customer information|product characteristic i), and may estimate the factor to be the cause for the customer to not purchase the object.

The electronic device 110 may create a message that is related to the object or the user by using the purchase intention, non-purchase intention, purchase cause, and non-purchase cause.

The method of using Equations 1 to 7 is only an example, and the message related to the object or the user may be created by using various methods without departing from the scope of the present disclosure.

In operation 1402, the electronic device 110 may display, on the display 215, the message related to the object or the user. Through operation 1402, the user may be provided with secondary information as well as the user's determination on the object. In some embodiments, the displayed message may include a user interface and icons for the user, and may include links for the user's convenience.

In some embodiments, the electronic device 110 may allow the user to listen to the message related to the object or the user through a speaker that is included in the electronic device 110. The electronic device 110 may allow the user to recognize message related to the object or the user by using a variety of methods.

The electronic device, according to various embodiments, may display a variety of messages on the display. The various messages may have a positive influence on the user to choose the object. The various messages may provide the user with a wide range of choices for the object. The electronic device may create the messages based on the user's reaction or emotion with respect to the object. The electronic device may adaptively induce the purchase of the object according to the user's reaction.

Figure 14B:
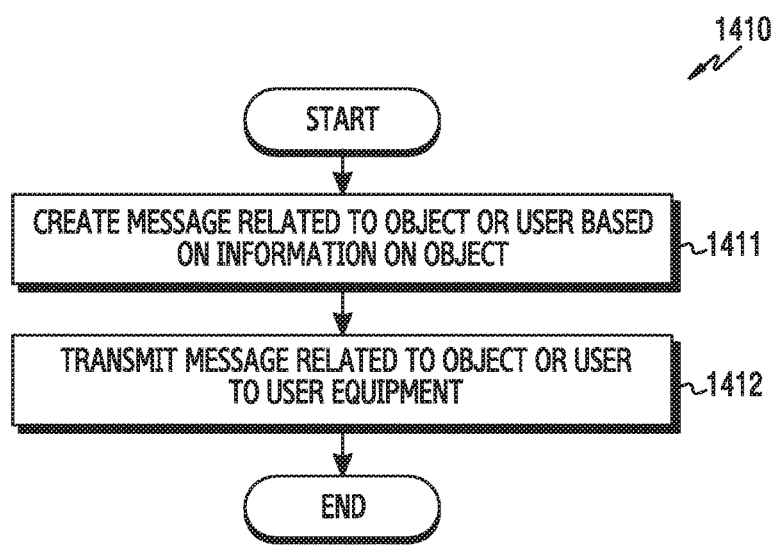
FIG. 14B is a flowchart illustrating an operation of the electronic device to transmit a message according to various embodiments of the present disclosure.

FIG. 14B is a flowchart illustrating an operation of the electronic device that transmits a message according to various embodiments of the present disclosure. The operation may be performed by the electronic device 110 shown in FIG. 1.

Reference to FIG. 14B, the operational flow 1410 may include operation 1411 and/or operation 1412.

In operation 1411, the electronic device 110 may create a message related to the object or the user based on the information on the object. Operation 1411 may correspond to operation 1401 illustrated in FIG. 14A.

In operation 1412, the electronic device 110 may transmit, to the UE 120, the message related to the object or the user. If the user moves away from the electronic device 110, the electronic device 110 may transmit, to the UE 120, the message related to the object or the user. The electronic device 110 may transmit, to the UE 120, the message related to the object or the user in order to induce the user to purchase the object.

Figure 14C:
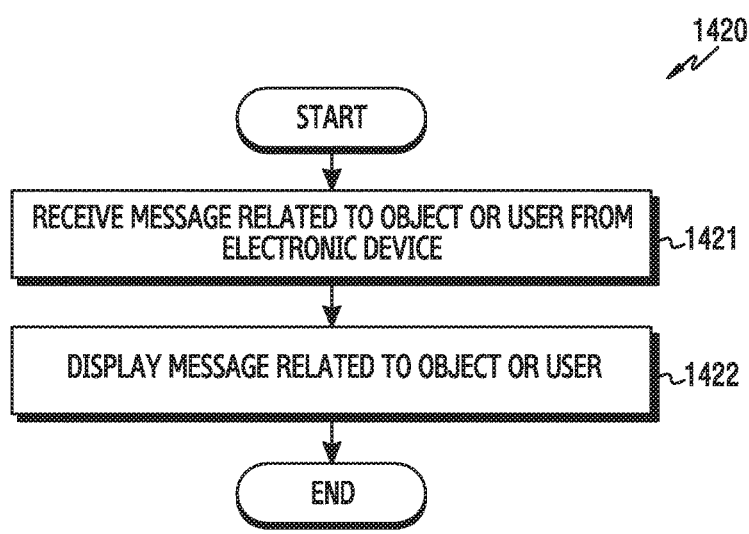
FIG. 14C is a flowchart illustrating an operation of the UE to receive and display a message according to various embodiments of the present disclosure.

FIG. 14C is a flowchart illustrating an operation of the UE that receives and displays a message according to various embodiments of the present disclosure. The operation above may be performed by the UE 120 shown in FIG. 1.

Referring to FIG. 14C, the operational flow 1420 may include operation 1421 and/or operation 1422.

In operation 1421, the UE 120 may receive the message related to the object or the user from the electronic device 110. If the user is away from the electronic device 110, the UE 120 may receive the message related to the object or the user.

In operation 1422, the UE 120 may display the message related to the object or the user on the display 415. Through the display operation above, the user may change the current emotion or reaction with respect to the object.

The electronic device 110, according to various embodiments, may provide information to the user regardless of the departure of the user in order to thereby provide a continuous service on the object.

Figure 14D:
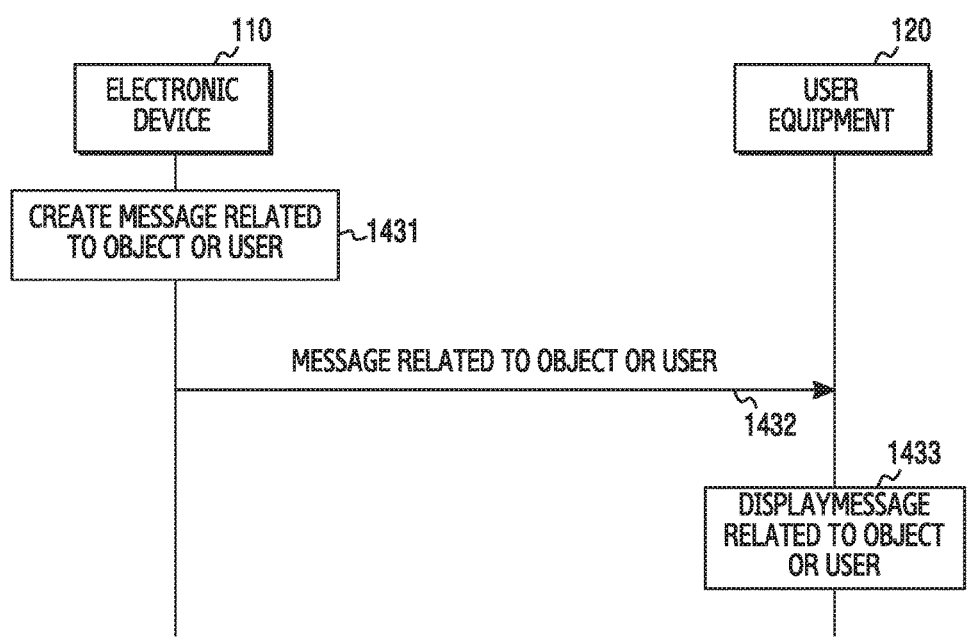
FIG. 14D is a flowchart of a message display process according to various embodiments of the present disclosure.

FIG. 14D is a flowchart of a message display process according to various embodiments of the present disclosure. The signal flow may be generated by the electronic device 110 and the UE 120, which are shown in FIG. 1.

Referring to FIG. 14D, in operation 1431, the electronic device 110 may create the message related to the object or the user. The electronic device 110 may create the message related to the object or the user in order to provide a continuous service or in order to change the user's feeling.

In operation 1432, the electronic device 110 may transmit, to the UE 120, the message related to the object or the user. The UE 120 may receive the message related to the object or the user from the electronic device 110.

In operation 1433, the UE 120 may display the received message. Through the operation above, the user of the UE 120 may be provided with a variety of information regardless of the distance from the electronic device 110.

Figure 15A:
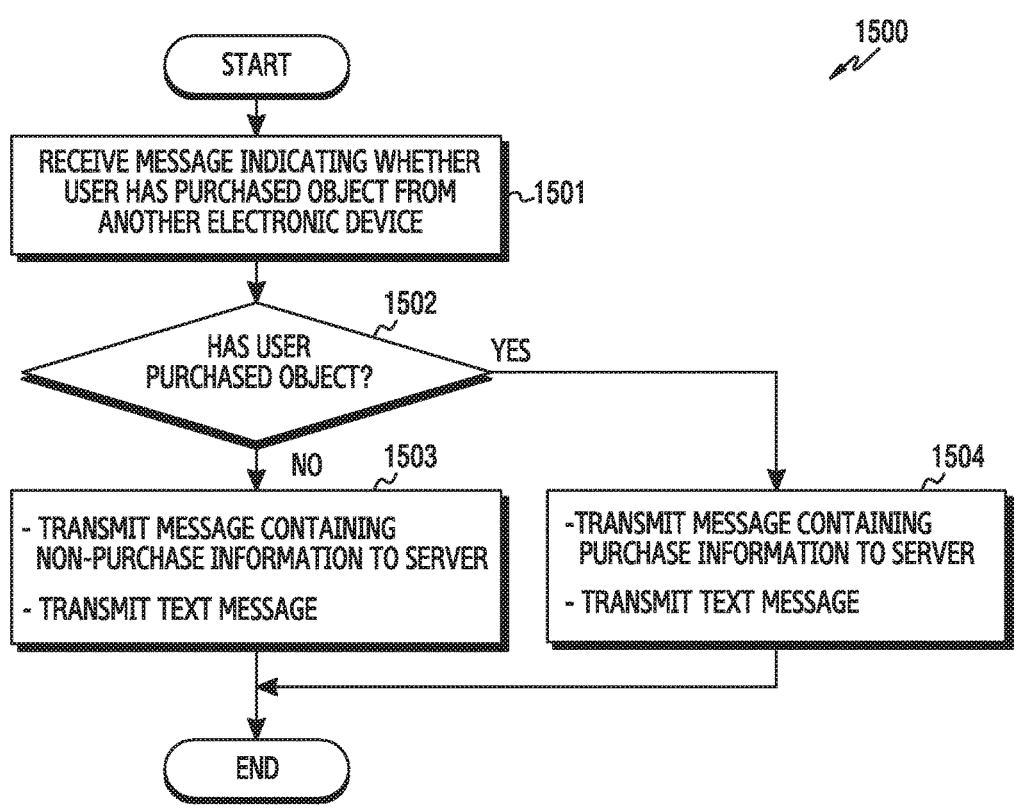
FIG. 15A is a flowchart illustrating an operation of the electronic device depending on the purchase or non-purchase of the object according to various embodiments of the present disclosure.

FIG. 15A is a flowchart illustrating an operation of the electronic device depending on the purchase of the object according to various embodiments of the present disclosure. The operation above may be performed by the electronic device 110 shown in FIG. 1.

Referring to FIG. 15A, the operational flow 1500 may include operation 1501, operation 1502, operation 1503, and/or operation 1504.

In operation 1501, the electronic device 110 may receive, from another electronic device, a message indicating whether or not the user has purchased the object. For example, if the user leaves the store without purchasing the object, the electronic device 110 may receive, from another electronic device, a message that contains information stating that the user has not purchased the object.

In operation 1502, the electronic device 110 may process the received message according to a determined rule, and may analyze whether or not the user has purchased the object. If the user has purchased the object, the electronic device 110 may perform operation 1504. On the contrary, if the user has not purchased the object, the electronic device 110 may perform operation 1503.

In operation 1504, the electronic device 110 may transmit, to the server 125, a message that contains purchase information. The operation of transmitting the message containing the purchase information may be an operation to update the user's purchase information in the server 125. The electronic device 110 may transmit a text message to the UE 120. The text message may be replaced by various types of messages. For example, unlike the illustration of FIG. 15A, the text message may contain images or links. The electronic device 110 may transmit the text message to the UE 120 for the subsequent purchase of the object.

In operation 1503, the electronic device 110 may transmit, to the server 125, a message that contains non-purchase information. The operation of transmitting the message containing the non-purchase information may be an operation to update the user's purchase information in the server 125. The electronic device 110 may transmit a text message to the UE 120. The text message may be replaced by various types of messages. The electronic device 110 may transmit the text message to the UE 120 in order to induce the subsequent purchase of the object.

Figure 15B:
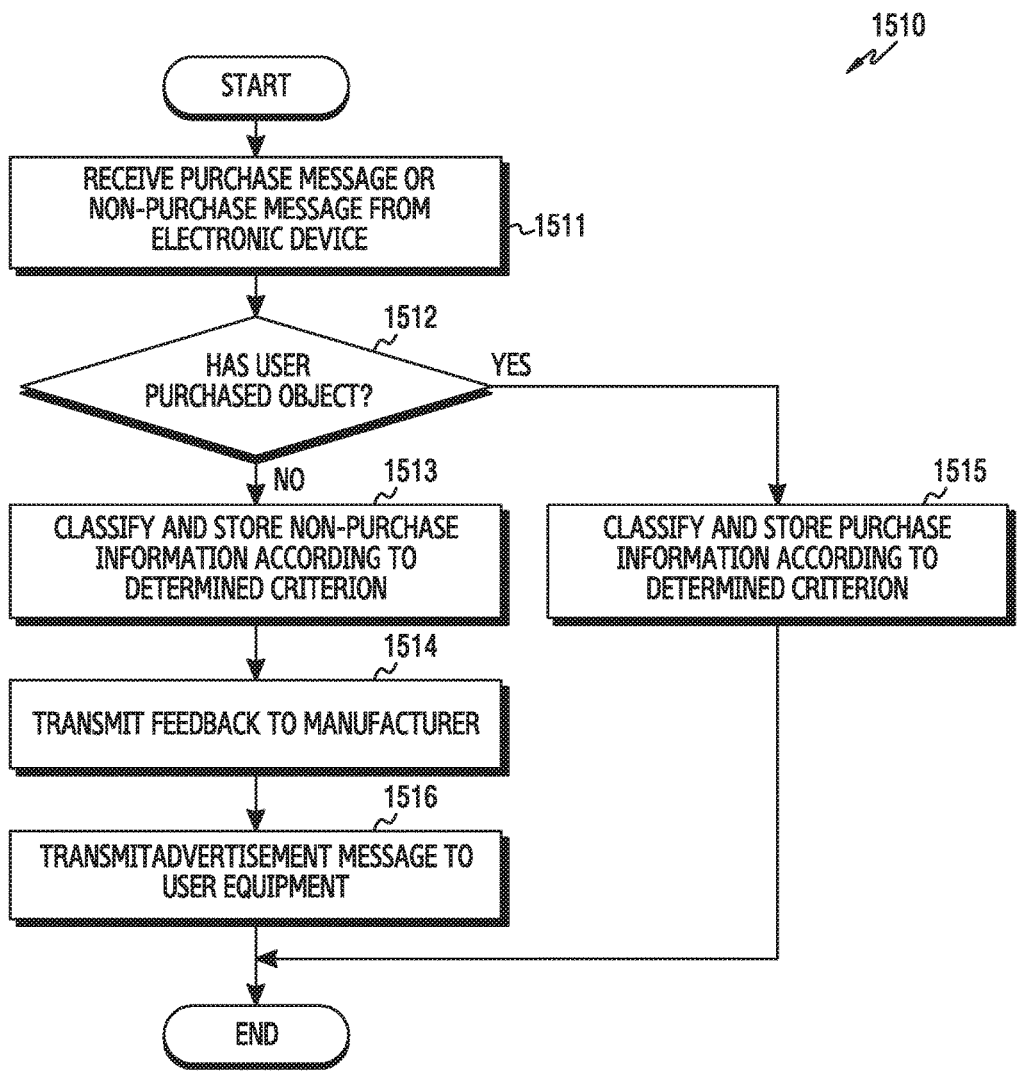
FIG. 15B is a flowchart illustrating an operation of the server to provide feedback according to various embodiments of the present disclosure.

FIG. 15B is a flowchart illustrating an operation of the server that provides feedback according to various embodiments of the present disclosure. The operation above may be performed by the server 125 shown in FIG. 1.

Referring to FIG. 15B, the operational flow 1510 may include operation 1511, operation 1512, operation 1513, operation 1514, operation 1515, and/or operation 1516.

In operation 1511, the server 125 may receive a purchase message or a non-purchase message from the electronic device 110. The purchase message may indicate that the user has purchased the object, and the non-purchase message may indicate that the user has not purchased the object.

In operation 1512, the server 125 may analyze the received message according to a determined rule in order to thereby determine whether or not the user has purchased the object. If the user has purchased the object, the server 125 may perform operation 1515. On the contrary, if the user has not purchased the object, the server 125 may perform operation 1513.

In operation 1513, the server 125 may classify the non-purchase information of the user according to a determined criterion to then be stored. For example, the server 125 may classify the non-purchase information of the user in order of date (or time) to then be stored, or may classify the same for each object. The server 125 may classify the information to be suitable for the subsequent provision of data.

In operation 1514, the server 125 may transmit feedback to the manufacturer. The server 125 may include the cause of not purchasing the object in the feedback, and may transmit the same to the manufacturer. The cause of not purchasing the object may be based on a survey of the user. The cause of not purchasing the object may be based on the information on the object, which is created based on the state information of the user. The manufacturer may develop an object that meets the user's tendency and the current trend by utilizing the feedback.

In operation 1516, the server 125 may transmit an advertisement message to the UE 120. The server 125 may create the advertisement message based on the received non-purchase message, and may transmit the same. For example, the server 125 may transmit, to the UE 120, an advertisement message that contains discount information for the user.

In operation 1515, the server 125 may classify the purchase information according to a determined criterion to then be stored. The server 125 may classify and store the purchase information to be suitable for the subsequent provision of information.

Although it is not shown in FIG. 15B, when the user has purchased the object, the server 125 may transmit, to the UE 120, a message that contains information to induce the user to revisit or to thank the user for the purchase.

Figure 15C:
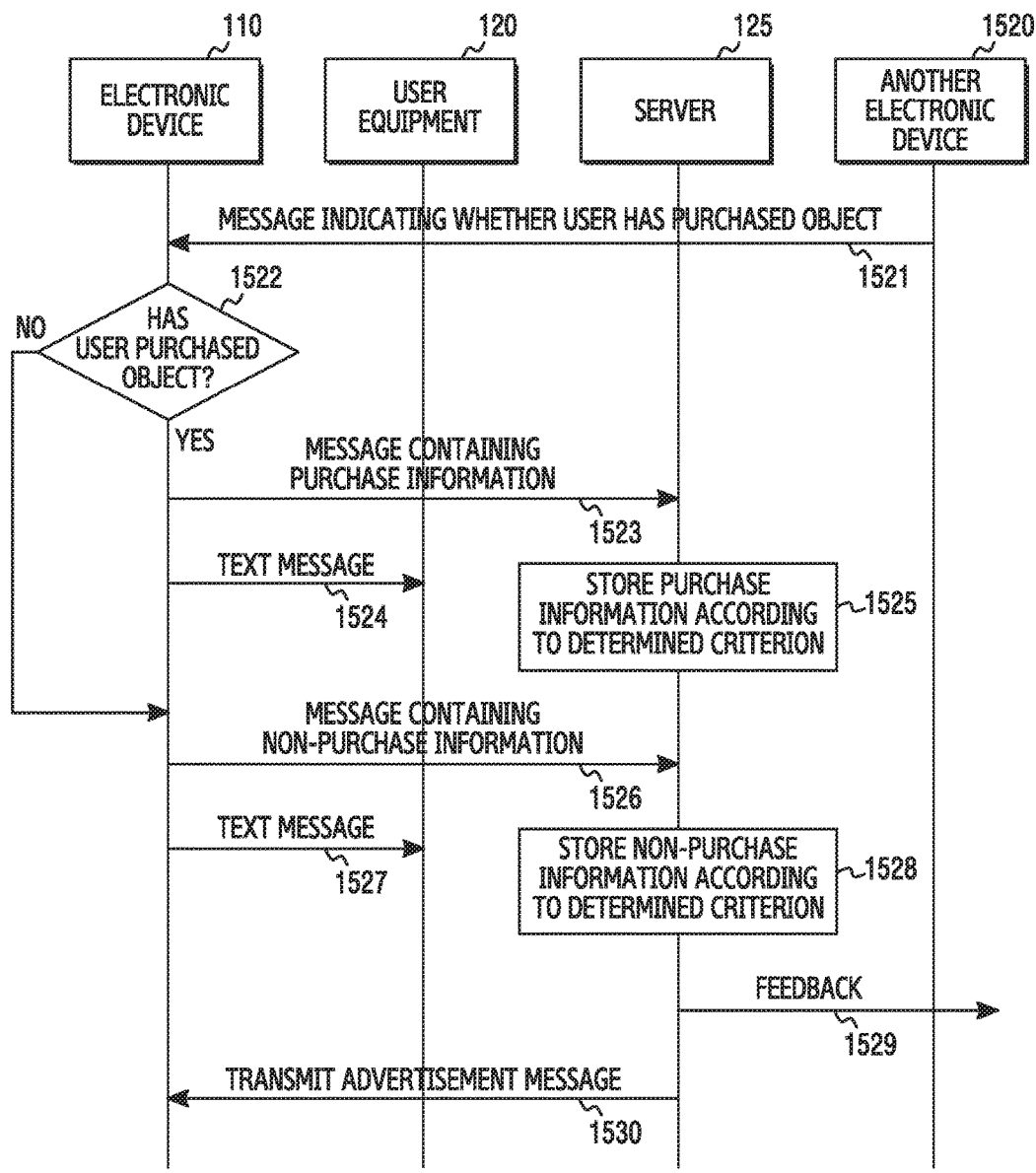
FIG. 15C illustrates a signal flow of a message transmission process according to various embodiments of the present disclosure.

FIG. 15C illustrates a signal flow of the message transmission process according to various embodiments of the present disclosure. The signal flow may be generated by the electronic device 110, the UE 120, and the server 125, which are shown in FIG. 1, and another electronic device 1520.

Referring to FIG. 15C, another electronic device 1520 may be a device for detecting the departure of the user from the store, or may be a device that is operationally connected with the device for detecting the departure of the user from the store. The other electronic device 1520 may recognize whether or not the user has purchased the object.

In operation 1521, another electronic device 1520 may transmit, to the electronic device 110, a message indicating whether or not the user has purchased the object. The electronic device 110 may receive the message indicating whether or not the user has purchased the object from another other electronic device 1520.

In operation 1522, the electronic device 110 may analyze whether or not the user has purchased the object.

If the user has purchased the object, in operation 1523, the electronic device 110 may transmit, to the server 125, a message that contains the purchase information. In addition, in operation 1524, the electronic device 110 may transmit a text message to the UE 120. Operations 1523 and 1524 may be performed at the same time, or may be performed in reverse order. In operation 1525, the server 125 may store the purchase information in response to the reception of the message containing the purchase information. The server 125 may classify and store the purchase information in order to easily respond to a subsequent data request.

If the user has not purchased the object, in operation 1526, the electronic device 110 may transmit, to the server 125, a message that contains non-purchase information. In addition, in operation 1527, the electronic device 110 may transmit a text message to the UE 120. Operations 1526 and 1527 may be performed at the same time, or may be performed in reverse order. In operation 1528, the server 125 may store the non-purchase information in order to easily respond to a subsequent data request or enquiry.

In operation 1529, the server 125 may provide feedback to the manufacturer. The feedback may be a reference or assistant material for the development of the object by the manufacturer.

In operation 1530, the server 125 may transmit an advertisement message to the electronic device 110. If the message is required to be transmitted to a plurality of users who enter the store according to a policy, the server 125 may transmit the advertisement message to the electronic device 110. In response thereto, the electronic device 110 may transmit the message to a plurality of users in the store.

As described above, the electronic device 110, according to various embodiments, may determine the user's intention for the purchase by using big data. In addition, the electronic device 110 may display a message to induce the user to purchase the object based on the determined user's intention for the purchase.

Figure 16:
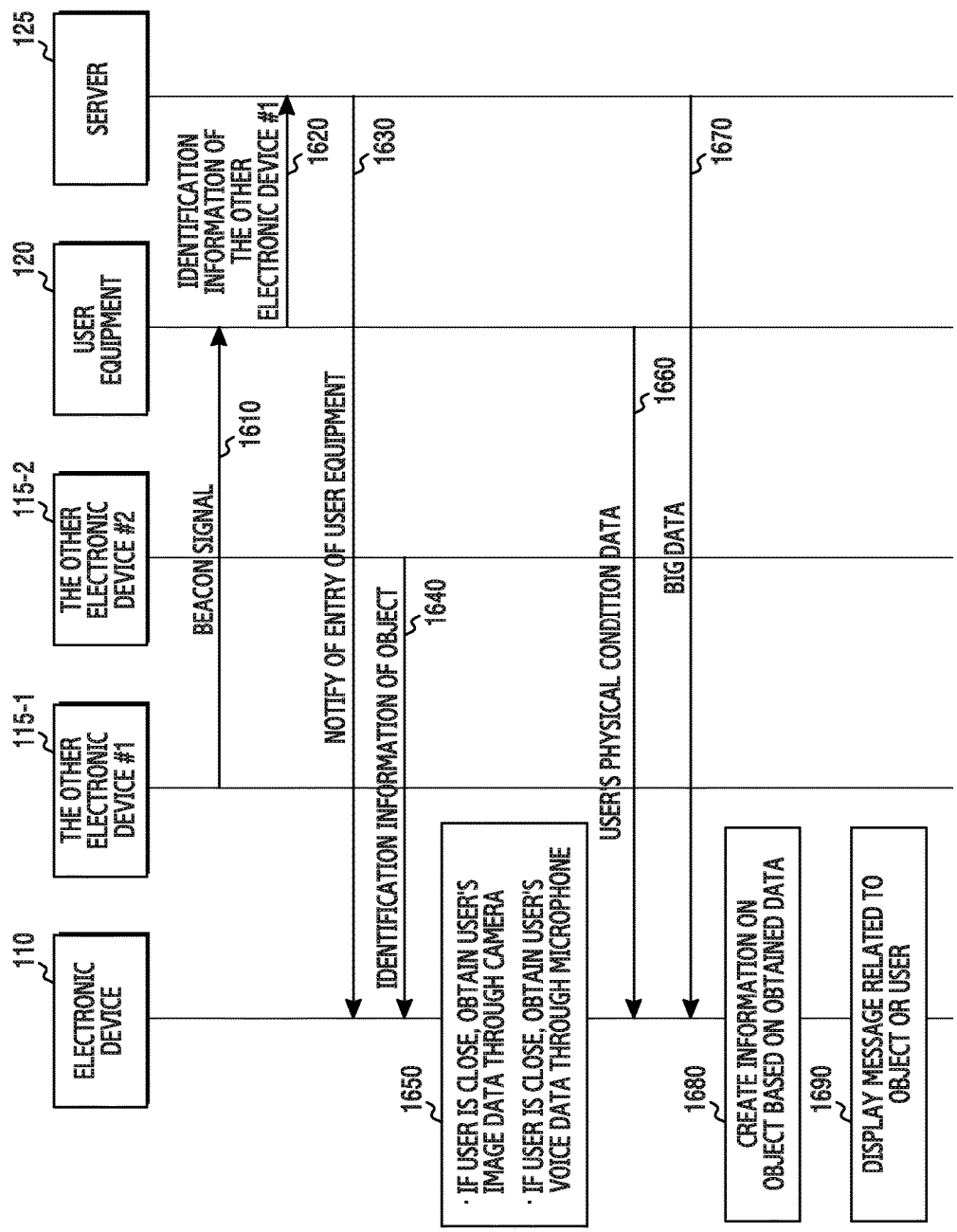
FIG. 16 illustrates a signal flow between devices according to various embodiments of the present disclosure.

FIG. 16 illustrates a signal flow between devices according to various embodiments of the present disclosure. This signal flow may be generated by the electronic device 110, the other electronic device 115 (e.g., the other electronic device #1 (115-1) and the other electronic device #2 (115-2)), the UE 120, and the server 125.

Referring to FIG. 16, in operation 1610, the other electronic device #1 (115-1), which is installed at the store entrance, may transmit a beacon signal to the UE 120. The beacon signal may contain the identification information of the store. Alternatively, the UE 120 may receive the beacon signal from the other electronic device #1 (115-1).

In operation 1620, the UE 120 may transmit the identification information of the other electronic device #1 (115-1) to the server 125. The server 125 may receive the identification information of the other electronic device #1 (115-1) from the UE 120.

In operation 1630, the server 125 may notify the electronic device 110 of the entry of the UE 120 into the store. In some embodiments, the server 125 may transmit the user information corresponding to the UE 120 together with the notification.

In operation 1640, the other electronic device #2 (115-2) may transmit, to the electronic device 110, the identification information of the object corresponding to the other electronic device #2 (115-2). The other electronic device #2 (115-2) may transmit the identification information of the object to the electronic device 110 in response to a change of the state.

In operation 1650, if the user is positioned close to the electronic device 110, the electronic device 110 may obtain a user's image data through the sensor 210 (e.g., the camera). The electronic device 110 may obtain a user's voice data through the sensor 210 (e.g., the microphone).

In operation 1660, the UE 120 may transmit a user's physical condition data to the electronic device 110. The electronic device 110 may receive the user's physical condition data from the UE 120.

Operation 1650 and operation 1660 may be performed at the same time, in sequence, or in reverse order.

In operation 1670, the server 125 may provide big data to the electronic device 110. The big data may contain data to assist the electronic device 110 in creating the information on the object based on the image data, the voice data, or the physical condition data.

In operation 1680, the electronic device 110 may create the information on the object based on the obtained data. The electronic device 110 may create the information on the object by using information that is pre-stored in the memory included in the electronic device 110 or by using information that is stored in the server 125.

In operation 1690, the electronic device 110 may display the message related to the object or the user based on the information on the object. For example, the electronic device 110 may display the message related to the object or the user on the display 215 that is included in the electronic device 110. As another example, the electronic device 110 may provide the user with a voice of the message related to the object or the user through a speaker included in the electronic device 110.

Although the embodiments of the present disclosure have been described for illustrative purposes, those skilled in the art will appreciate that various modifications, additions and substitutions are possible, without departing from the scope and spirit of the disclosure.

Therefore, the embodiments of the present disclosure are not intended to limit the technical concept of the present disclosure, but are intended to describe the same. Thus, the technical scope of the present disclosure is not limited to the embodiments. The scope of the present disclosure should be interpreted by the claims below, and all the technical concepts equivalent thereto should be construed as being included in the scope of the present disclosure.

Methods stated in claims and/or specifications according to various embodiments may be implemented by hardware, software, or a combination of hardware and software.

In the implementation of software, a non-transitory computer-readable storage medium for storing one or more programs (software modules) may be provided. The one or more programs stored in the non-transitory computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a ROM, an EEPROM, a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the internet, intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method of a digital media device for providing service with respect to an object, the operating method comprising:
    receiving, by the digital media device, a first identification information of a first electronic device of a user from the first electronic device;
    receiving, by the digital media device, a second identification information of the object, from a second electronic device corresponding to the object;
    determining whether an event includes a case where the object and the first electronic device of the user are positioned in a designated area within a predetermined distance based on the first identification information of the first electronic device and the second identification information of the second electronic device;
    obtaining, by the digital media device, state information of the user based on determining that the object and the first electronic device of the user are positioned in the designated area within the predetermined distance;
    obtaining, by the digital media device, data related to the state information of the user, from a server; and
    creating, by the digital media device, reaction information with respect to the object based on a change in the state information of the user due to the user interacting with the object based on the data related to the state information of the user,
    wherein the state information of the user comprises at least one of a first state information of the user detected by the digital media device through at least one sensor and a second state information of the user received by the digital media device from the first electronic device of the user.

2. The method according to claim 1,
    wherein the first state information of the user contains at least one of the user's voice information, the user's facial expression information, the user's gesture information, or the user's motion information, and
    wherein the second state information of the user contains at least one of the user's heart rate and the user's brain waves.

3. The method according to claim 1, further comprising:
    displaying a message that is related to at least one of the object or the user based on at least one of reaction information with respect to the object or the state information of the user.

4. The method according to claim 1,
    wherein the state information of the user contains image data of the user's face, and
    wherein the creating of the reaction information with respect to the object comprises:
        if a change pattern of the image data for the user's face is related to one of a plurality of reference patterns, determining the user's emotion with respect to an object corresponding to a related reference pattern, and
        creating reaction information with respect to the object based on the determined user's emotion.

5. The method according to claim 1,
    wherein the state information of the user includes image data of the user's gesture, and wherein the creating of the reaction information with respect to the object comprises:
converting the image data of the user's gesture into a skeleton,
if a change pattern of the skeleton is related to one of a plurality of reference patterns, determining the user's emotion with respect to an object corresponding to a related reference pattern, and
creating reaction information with respect to the object based on the determined user's emotion.

6. The method according to claim 1,
wherein the state information of the user includes a voice signal of the user, and
wherein the creating of the reaction information with respect to the object comprises:
if the voice signal of the user contains at least one of a plurality of reference words, analyzing beginning and latter parts of a word that matches the reference word in the voice signal,
identifying the user's intention through the analyzed parts, and
creating reaction information with respect to the object based on the identified user's intention.

7. The method according to claim 1, wherein the creating of the reaction information with respect to the object comprises converting the image data of the user's gesture into a skeleton, if a change pattern of the skeleton is related to one of a plurality of reference patterns, determining user's emotion with respect to the object corresponding to a related reference pattern, and creating reaction information with respect to the object based on the determined user's emotion.

8. A digital media device comprising:
at least one processor;
a transceiver configured to be operationally connected with the at least one processor; and
at least one sensor configured to be operationally connected with the at least one processor,
wherein the at least one processor is configured to:
receive a first identification information of a first electronic device of a user from the first electronic device,
receive a second identification information of the object, from a second electronic device corresponding to the object,
determine whether an event includes a case where the object and the first electronic device of the user are positioned in a designated area within a predetermined distance based on the first identification information of the first electronic device and the second identification information of the second electronic device,
obtain state information of the user based on determining that the object and the first electronic device of the user are positioned in the designated area within the predetermined distance,
obtain data related to the state information of the user, from a server, and
create reaction information with respect to the object based on a change in the state information of the user due to the user interacting with the object based on the data related to the state information of the user, and
wherein the state information of the user comprises at least one of a first state information of the user detected by the digital media device through at least one sensor and a second state information of the user received by the digital media device from the first electronic device of the user.

9. The digital media device according to claim 8,
wherein the state information of the user contains at least one of the user's voice information, the user's facial expression information, the user's gesture information, or the user's motion information, and
wherein the second state information of the user contains at least one of the user's heart rate and the user's brain waves.

10. The digital media device according to claim 8, wherein the at least one processor is further configured to control to display a message that is related to at least one of the object or the user based on at least one of reaction information with respect to the object or the state information of the user.

11. The digital media device according to claim 8,
wherein the state information of the user contains image data of the user's face, and
wherein the at least one processor is further configured to:
determine the user's emotion with respect to an object corresponding to a related reference pattern if a change pattern of the image data for the user's face is related to one of a plurality of reference patterns, and
create reaction information with respect to the object based on the determined user's emotion.

12. The digital media device according to claim 8,
wherein the state information of the user includes image data of the user's gesture, and
wherein the at least one processor is further configured to:
convert the image data of the user's gesture into a skeleton,
determine the user's emotion with respect to an object corresponding to a related reference pattern if a change pattern of the skeleton is related to one of a plurality of reference patterns, and
create reaction information with respect to the object based on the determined user's emotion.

13. The digital media device according to claim 8,
wherein the state information of the user includes a voice signal of the user, and
wherein the at least one processor is further configured to:
analyze beginning and latter parts of a word that matches the reference word in the voice signal if the voice signal of the user includes at least one of a plurality of reference words,
identify the user's intention through the analyzed parts, and
create reaction information with respect to the object based on the identified user's intention.

14. The digital media device according to claim 8, wherein the creating of the reaction information with respect to the object comprises converting the image data of the user's gesture into a skeleton, if a change pattern of the skeleton is related to one of a plurality of reference patterns, determining user's emotion with respect to the object corresponding to a related reference pattern, and creating reaction information with respect to the object based on the determined user's emotion.

* * * * *